US012786939B2

(12) United States Patent
Bao et al.

(10) Patent No.: US 12,786,939 B2
(45) Date of Patent: Nov. 3, 2026

(54) POSITIONING METHOD, USER EQUIPMENT AND NETWORK DEVICE

(71) Applicant: DATANG MOBILE COMMUNICATIONS EQUIPMENT CO., LTD., Beijing (CN)

(72) Inventors: Chenxi Bao, Beijing (CN); Yunjing Hou, Beijing (CN); Qiang Deng, Beijing (CN); Yong Jiang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 277 days.

(21) Appl. No.: 18/698,783

(22) PCT Filed: Oct. 31, 2022

(86) PCT No.: PCT/CN2022/128755
§ 371 (c)(1),
(2) Date: Apr. 5, 2024

(87) PCT Pub. No.: WO2023/078218
PCT Pub. Date: May 11, 2023

(65) Prior Publication Data

US 2024/0422715 A1 Dec. 19, 2024

(30) Foreign Application Priority Data

Nov. 2, 2021 (CN) ......................... 202111288388.6

(51) Int. Cl.
*H04W 64/00* (2009.01)
*H04W 8/00* (2009.01)
*H04W 60/04* (2009.01)

(52) U.S. Cl.
CPC ........... *H04W 64/00* (2013.01); *H04W 8/005* (2013.01); *H04W 60/04* (2013.01)

(58) Field of Classification Search
CPC ........ H04W 64/00; H04W 4/02; H04W 4/023
See application file for complete search history.

(56) References Cited

U.S. PATENT DOCUMENTS

2015/0319727 A1* 11/2015 Guo ...................... H04W 60/00 455/435.1
2017/0212206 A1 7/2017 Kim et al.
2023/0076030 A1* 3/2023 Baek ................... H04W 64/006

FOREIGN PATENT DOCUMENTS

| | | | |
|---|---|---|---|
| CN | 110536234 | A | 12/2019 |
| CN | 111562546 | A | 8/2020 |
| WO | 2021167393 | A1 | 8/2021 |

OTHER PUBLICATIONS

Office Action of Corresponding Cn Patent Application No. 202111288388.6 Dated Sep. 18, 2025.

(Continued)

*Primary Examiner* — Nabil H Syed
(74) *Attorney, Agent, or Firm* — KILPATRICK TOWNSEND & STOCKTON LLP

(57) ABSTRACT

A positioning method, a user equipment and a network device provided by the present disclosure realize positioning of the user equipment by combining proximity based services, where the network device receives a location request for a target UE; if it is determined that the target UE supports a proximity assisted positioning function and the network device determines to trigger an assisted positioning process for the target UE, the network device obtains self-positioning information of the target UE and assisted positioning information, and performs positioning processing on the target UE according to the self-positioning information of the target UE and the assisted positioning information to (Continued)

obtain a positioning result, where the assisted positioning information is information obtained by a proximal UE performing assisted positioning measurement on the target UE.

18 Claims, 9 Drawing Sheets

(56) References Cited

OTHER PUBLICATIONS

Intel Corporation, ESA, "Running CR for the introduction of NR positioning," 3GPP TSG-RAN WG2 Meeting #109 electronic, R2-2001934, Elbonia, Feb. 24-Mar. 6, 2020.
Catt, "Clarification on UE Positioning Architecture," 3GPP TSG-RAN2 Meeting #109bis, R2-2003995, Electronic meeting, Apr. 20-Apr. 30, 2020.
Qualcomm Incorporated, "Storage of UE Positioning Capabilities by 5GCN," 3GPP TSG-SA WG2 Meeting #145E (e-meeting), S2-2104768, Elbonia, May 17-28, 2021.
European Patent Office, Extended European Search Report Issued in Application No. 22889243.6, Oct. 25, 2024, Germany, 15 pages.
State Intellectual Property Office of the People's Republic of China, International Search Report and written opinion issued in Application No. PCT/CN2022/128755, Dec. 19, 2022, 15 pages.
Cewit et al., "Discussion on positioning enhancements for Release 17", 3GPP TSG RAN WG1 103-e, e-meeting, Oct. 16-Nov. 13, 2020, total 8 pages, R1-2008718.
Catt, "Ue positioning capability storage", 3GPP Tsg-Sa WG2 Meeting #145E, Elbonia, May 17-28, 2021, total 18 pages, S2-2105123.

* cited by examiner

POSITIONING METHOD, USER EQUIPMENT AND NETWORK DEVICE

CROSS-REFERENCES TO RELATED APPLICATION

The present disclosure is a National Stage of International Application No. PCT/CN2022/128755, filed on Oct. 31, 2022, which claims priority to Chinese patent application No. 202111288388.6, filed to China National Intellectual Property Administration on Nov. 2, 2021 and entitled "POSITIONING METHOD, USER EQUIPMENT AND NETWORK DEVICE". The above applications are hereby incorporated by reference in their entireties.

FIELD

The present disclosure relates to the field of wireless communication technologies and, in particular, to a positioning method, a user equipment and a network device.

BACKGROUND

Generally, 3GPP-based positioning technology is implemented based on an MO-LR (Mobile Originated-Location Request) or an MT-LR (Mobile Terminated-Location Request). With the MO-LR or the MT-LR, a target UE may send a request for locating the UE itself based on the UE itself or a third-party application (AF/LCS client), and a network device can perform positioning processing on the user equipment according to the location request.

With the development of communication technologies, there are more requirements for the location accuracy of the target UE. Based on this, how to improve the UE positioning method to enhance the positioning capability has become an urgent problem to be solved.

SUMMARY

The present disclosure provides a positioning method, a user equipment and a network device. Based on proximity based services, assisted positioning can be performed on a target UE by utilizing a proximal UE of the target UE, and a network device can perform positioning processing on the target UE based on self-positioning information and assisted positioning information, to improve the location accuracy.

In one embodiment of the present disclosure provides a positioning method, where the positioning method is applied to a terminal side, and the method includes:

- sending a location request:
- receiving a first assistance request message sent by a location management function LMF, where the first assistance request message is configured to request a target UE to provide assisted positioning information:
- sending a first response message to the location management function LMF, where the first response message includes self-positioning information of the target UE and the assisted positioning information:
- obtaining a positioning result, where the positioning result is obtained by the location management function LMF performing positioning processing on the target UE according to the first response message.

In some embodiments, the assisted positioning information includes: location information of a proximal UE and/or relative location information of the proximal UE and the target UE.

In some embodiments, the method further includes:

- executing a proximity discovery process, and taking a UE supporting a proximity assisted positioning function discovered by the proximity discovery process as the proximal UE.

In some embodiments, the method further includes:

- receiving a retransmission message sent by the location management function LMF, where the retransmission message is sent by the location management function LMF when determining that the assisted positioning information does not meet an assisted positioning condition:
- re-executing a proximity discovery process according to the retransmission message to determine a new proximal UE, requesting the new proximal UE to perform assisted positioning measurement on the target UE, and obtaining new assisted positioning information returned by the new proximal UE:
- sending a retransmission response message to the location management function LMF, where the retransmission response message includes the new assisted positioning information and the self-positioning information of the target UE.

In some embodiments, the method further includes:

- sending registration information to a network side, where the registration information includes a first proximity assisted positioning parameter, and the first proximity assisted positioning parameter is configured to represent that the target UE supports a proximity assisted positioning function.

In some embodiments, the location request carries a second proximity assisted positioning parameter, and the second proximity assisted positioning parameter is configured to represent that the target UE supports a proximity assisted positioning function.

In one embodiment of the present disclosure further provides a positioning method, where the positioning method is applied to a network side, and the method includes:

- receiving a location request to locate a target UE;
- if it is determined that the target UE supports a proximity assisted positioning function and it is determined to trigger an assisted positioning process for the target UE, obtaining self-positioning information of the target UE and assisted positioning information, where the assisted positioning information is information obtained by a proximal UE performing assisted positioning measurement on the target UE;
- performing positioning processing on the target UE according to the self-positioning information of the target UE and the assisted positioning information to obtain a positioning result.

In some embodiments, obtaining the self-positioning information of the target UE and the assisted positioning information includes:

- sending a first assistance request message to the target UE, where the first assistance request message is configured to request the target UE to report the assisted positioning information:
- receiving a first response message returned by the target UE, where the first response message includes the self-positioning information of the target UE and the assisted positioning information.

In some embodiments, obtaining the self-positioning information of the target UE and the assisted positioning information includes:

sending a second assistance request message to the target UE, where the second assistance request message is configured to request the target UE to report identification information of the proximal UE:

receiving a second response message returned by the target UE, where the second response message includes the self-positioning information of the target UE and the identification information of the proximal UE.

In some embodiments, the positioning method further includes:

sending a third assistance request message to the proximal UE according to the identification information, where the third assistance request message is configured to request the proximal UE to perform assisted positioning measurement on the target UE;

receiving the assisted positioning information of the target UE returned by the proximal UE.

In some embodiments, performing the positioning processing on the target UE according to the self-positioning information of the target UE and the assisted positioning information includes:

if the assisted positioning information does not meet an assisted positioning condition, sending a retransmission message to the target UE, where the retransmission message is configured to request the target UE to re-execute a proximity discovery process.

In some embodiments, determining that the target UE supports the proximity assisted positioning function includes:

determining that the target UE supports the proximity assisted positioning function, according to registration information of the target UE.

In some embodiments, determining that the target UE supports the proximity assisted positioning function includes:

determining that the target UE supports the proximity assisted positioning function, according to user subscription information of the target UE.

In some embodiments, determining that the target UE supports the proximity assisted positioning function includes:

determining that the target UE supports the proximity assisted positioning function, according to the location request.

In some embodiments, determining to trigger the assisted positioning process for the target UE includes:

if it is determined that a current network meet at least one condition of following conditions, triggering the assisted positioning process for the target UE;

where the at least one condition includes:

a current network environment of the target UE conforms to a network environment of assisted positioning:

the location request carries location requirement information for assisted positioning processing.

In some embodiments, the positioning method further includes:

if it is determined that the target UE meets one of following conditions, sending a report request of the self-positioning information to the target UE;

performing the positioning processing on the target UE according to the self-positioning information returned by the target UE to obtain the positioning result of the target UE, where the conditions include:

the target UE does not support the proximity assisted positioning function;

it is determined not to trigger the assisted positioning process for the target UE;

a current network device does not support the proximity assisted positioning function.

In one embodiment of the present disclosure provides a user equipment, including a memory, a transceiver, and a processor:

the memory is configured to store a computer program: the transceiver is configured to transceive information under a control of the processor: the processor is configured to read the computer program in the memory and execute the following operations:

sending a location request to a location management function LMF:

receiving a first assistance request message sent by the location management function LMF, where the first assistance request message is configured to request a target UE to provide assisted positioning information:

sending a first response message to the location management function LMF, where the first response message includes self-positioning information of the target UE and the assisted positioning information:

obtaining a positioning result, where the positioning result is obtained by the location management function LMF performing positioning processing on the target UE according to the first response message.

In some embodiments, the assisted positioning information includes location information of a proximal UE and/or relative location information of the proximal UE and the target UE.

In some embodiments, the processor is further configured to execute the following operations:

executing a proximity discovery process, and taking a UE supporting a proximity assisted positioning function discovered by the proximity discovery process as the proximal UE.

In some embodiments, the processor is further configured to execute the following operations:

receiving a retransmission message sent by the location management function LMF, where the retransmission message is sent by the location management function LMF when determining that the assisted positioning information does not meet an assisted positioning condition: re-executing a proximity discovery process according to the retransmission message to determine a new proximal UE, requesting the new proximal UE to perform assisted positioning measurement on the target UE, and obtaining new assisted positioning information returned by the new proximal UE: sending a retransmission response message to the location management function LMF, where the retransmission response message includes the new assisted positioning information and the self-positioning information of the target UE.

In some embodiments, the processor is further configured to execute the following operations:

sending registration information to a network side, where the registration information includes a first proximity assisted positioning parameter, and the first proximity assisted positioning parameter is configured to represent that the target UE supports a proximity assisted positioning function;

and/or, having the location request carry a second proximity assisted positioning parameter, where the second proximity assisted positioning parameter is configured to represent that the target UE supports a proximity assisted positioning function.

In one embodiment of the present disclosure provides a network device, including a memory, a transceiver, and a processor:

the memory is configured to store a computer program: the transceiver is configured to transceive information under a control of the processor: the processor is configured to read the computer program in the memory and execute the following operations:

receiving a location request to locate a target UE;

if it is determined that the target UE supports a proximity assisted positioning function and it is determined to trigger an assisted positioning process for the target UE, obtaining self-positioning information of the target UE and assisted positioning information, where the assisted positioning information is information obtained by a proximal UE performing assisted positioning measurement on the target UE;

performing positioning processing on the target UE according to the self-positioning information of the target UE and the assisted positioning information to obtain a positioning result.

In some embodiments, when the processor executes an operation of obtaining the self-positioning information of the target UE and the assisted positioning information, the operation includes:

sending a first assistance request message to the target UE, where the first assistance request message is configured to request the target UE to report the assisted positioning information: receiving a first response message returned by the target UE, where the first response message includes the self-positioning information of the target UE and the assisted positioning information.

In some embodiments, when the processor executes an operation of obtaining the self-positioning information of the target UE and the assisted positioning information, the operation includes:

sending a second assistance request message to the target UE, where the second assistance request message is configured to request the target UE to report identification information of the proximal UE: receiving a second response message returned by the target UE, where the second response message includes the self-positioning information of the target UE and the identification information of the proximal UE.

In some embodiments, the processor is further configured to execute the following operations:

sending a third assistance request message to the proximal UE according to the identification information, where the third assistance request message is configured to request the proximal UE to perform assisted positioning measurement on the target UE; receiving the assisted positioning information of the target UE returned by the proximal UE.

In some embodiments, when the processor executes an operation of performing the positioning processing on the target UE according to the self-positioning information of the target UE and the assisted positioning information, the operation includes:

if the assisted positioning information does not meet an assisted positioning condition, sending a retransmission message to the target UE, where the retransmission message is configured to request the target UE to re-execute a proximity discovery process.

In some embodiments, when the processor executes an operation of determining that the target UE supports the proximity assisted positioning function, the operation includes:

determining that the target UE supports the proximity assisted positioning function, according to registration information of the target UE; and/or, determining that the target UE supports the proximity assisted positioning function, according to user subscription information of the target UE; and/or, determining that the target UE supports the proximity assisted positioning function, according to the location request.

In some embodiments, when the processor executes an operation of determining to trigger the assisted positioning process for the target UE, the operation includes:

if it is determined that a current network meet at least one condition of following conditions, triggering the assisted positioning process for the target UE; where the at least one condition includes:

a current network environment of the target UE conforms to a network environment of assisted positioning:

the location request carries location requirement information for assisted positioning processing.

In some embodiments, the processor is further configured to execute the following operations:

if it is determined that the target UE meets one of following conditions, sending a report request of the self-positioning information to the target UE;

performing the positioning processing on the target UE according to the self-positioning information returned by the target UE to obtain the positioning result of the target UE, where the conditions include:

the target UE does not support the proximity assisted positioning function;

it is determined not to trigger the assisted positioning process for the target UE;

a current network device does not support the proximity assisted positioning function.

In one embodiment of the present disclosure provides a user equipment, including:

a first transceiving unit, configured to: send a location request; receive a first assistance request message sent by a location management function LMF, where the first assistance request message is configured to request a target UE to provide assisted positioning information: send a first response message to the location management function LMF, where the first response message includes self-positioning information of the target UE and the assisted positioning information: obtain a positioning result, where the positioning result is obtained by the location management function LMF performing positioning processing on the target UE according to the first response message.

In one embodiment of the present disclosure provides a network device, including:

a second transceiving unit, configured to receive a location request to locate a target UE;

a positioning unit, configured to: obtain self-positioning information of the target UE and assisted positioning information in a case of determining that the target UE supports a proximity assisted positioning function and determining to trigger an assisted positioning process for the target UE, where the assisted positioning information is information obtained by a proximal UE performing assisted positioning measurement on the target UE; perform positioning processing on the target UE according to the self-positioning information of the target UE and the assisted positioning information to obtain a positioning result;

the second transceiving unit is further configured to return the positioning result to the target UE.

In one embodiment of the present disclosure provides a processor-readable storage medium, where the processor-readable storage medium stores a computer program, and the computer program is configured to cause a processor to execute the method according to the embodiments.

In one embodiment of the present disclosure provides a computer program product, including a computer program, where when the computer program is executed by a processor, the method according to the embodiments are implemented.

The positioning method, the user equipment and the network device provided by the present disclosure realize positioning of the user equipment by combining the proximity based services, where the network device receives the location request for the target UE; if it is determined that the target UE supports the proximity assisted positioning function and the network device determines to trigger the assisted positioning process for the target UE, the network device obtains the self-positioning information of the target UE and the assisted positioning information, and performs positioning processing on the target UE according to the self-positioning information of the target UE and the assisted positioning information to obtain the positioning result, where the assisted positioning information is information obtained by the proximal UE performing assisted positioning measurement on the target UE. Compared with the prior art, the positioning technology provided by the present disclosure takes the assisted positioning information into account during positioning processing, and its positioning capability is stronger and the accuracy is higher.

It should be understood that the content described in the SUMMARY section is not intended to limit essential or important features of the embodiments of the present disclosure, nor is it intended to limit the scope of the present disclosure. Other features of the present disclosure will be readily understood from the following description.

BRIEF DESCRIPTION OF THE DRAWINGS

In order to explain technical solutions in the present disclosure or in the prior art more clearly, drawings required to be used in the description of embodiments or the prior art will be introduced briefly in the following. It is obvious that the drawings in the following description are for some embodiments of the present disclosure.

DESCRIPTION OF EMBODIMENTS

Example embodiments of the present disclosure are described below with reference to accompanying drawings, in which various details of the embodiments of the present disclosure are included to facilitate understanding, and should be considered as examples only. Various changes and modifications may be made to the embodiments described herein without departing from the scope and spirit of the present disclosure. Similarly, for clarity and conciseness, descriptions of well-known functions and structures are omitted in the following description.

With regard to positioning approaches in the prior art, when a network environment of a user equipment is poor, a problem that the positioning capability is reduced or the location accuracy is not high is easy to occur. The present disclosure provides a positioning method, a user equipment and a network device, in which assisted positioning can be performed on a target UE by utilizing a proximal UE of the target UE, and a network device can perform positioning processing on the target UE based on assisted positioning information, to improve the location accuracy.

The method and the apparatus are based on a same application concept. Since the method and the apparatus solve the problem with similar principles, reference for the implementation of the apparatus and the method can be made to each other, and the repetition is not repeated here.

In order to clearly understand the embodiments of the present disclosure, solutions in the prior art are firstly introduced in detail.

Figure 1:
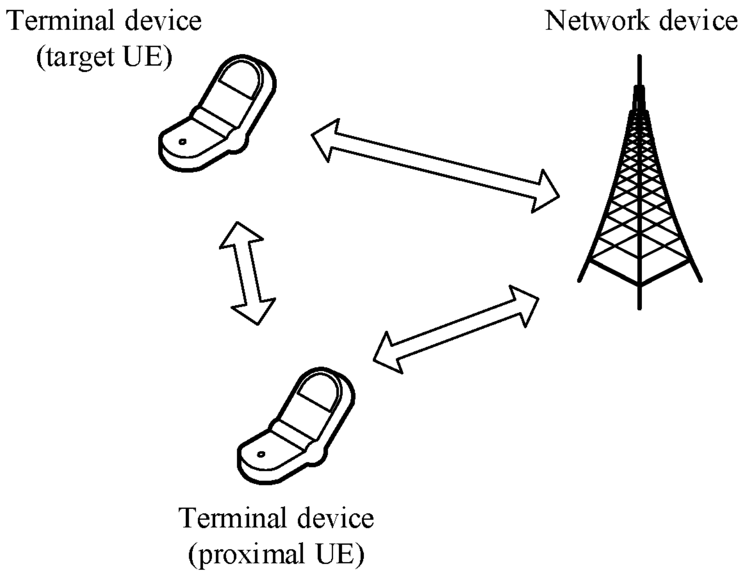
FIG. 1 is a network architecture provided by the present disclosure.

FIG. 1 is a network architecture provided by the present disclosure. As shown in FIG. 1, the network architecture includes a terminal device (including a target UE and a proximal UE) and a network device.

The terminal device in FIG. 1 may refer to a device that provides voice and/or data connectivity to a user, a handheld device with a wireless connection function, or other processing devices connected to a wireless modem, etc.

The terminal device involved in the embodiments of the present disclosure may refer to a device that provides voice and/or data connectivity to a user, a handheld device with a wireless connection function, or other processing devices connected to a wireless modem, etc. In different systems, the name of the terminal device may be different. For example, in a 5G system, the terminal device may be called a user equipment (UE). A wireless terminal device may communicate with one or more core networks (CN) via a radio access network (RAN). The wireless terminal device may be a mobile terminal device, such as a mobile phone (or "cellular" phone) and a computer with a mobile terminal device. For example, the mobile terminal device may be portable, pocket-sized, handheld, computer-built or vehicle-mounted mobile apparatuses, which exchange voice and/or data with the radio access network, such as a personal communication service (PCS) phone, a cordless phone, a session initiated protocol (SIP) phone, a wireless local loop (WLL) station, a personal digital assistant (PDA) and other devices. The wireless terminal device may also be called a system, a subscriber unit, a subscriber station, a mobile station, a mobile, a remote station, an access point, a remote terminal, an access terminal, a user terminal, a user agent, a user device, which is not limited in the embodiments of the present disclosure.

The network device involved in the embodiments of the present disclosure may be a base station, and the base station may include multiple cells providing services for terminals. Depending on a specific application, the base station may also be called an access point, or a device in an access network that communicates with a wireless terminal device through one or more sectors over an air interface, or other names. The network device may be configured to exchange a received over-the-air frame with an Internet protocol (IP) packet, and act as a router between the wireless terminal device and the rest of the access network, where the rest of the access network may include an Internet protocol (IP) communication network. The network device may also coordinate property management of the air interface. For example, the network device involved in the embodiments of the present disclosure may be a network device (Base Transceiver Station, BTS) in a global system for mobile communications (GSM) or code division multiple access (CDMA), or a network device (NodeB) in wide-band code division multiple access (WCDMA), or an evolutional network device (evolutional Node B, eNB or e-NodeB) in a long term evolution (LTE) system, a 5G base station (gNB) in a 5G network architecture (next generation system), or a home evolved base station (Home evolved Node B, HeNB), a relay node, a home base station (femto), a pico base station (pico), etc., which is not limited in the embodiments of the present disclosure. In some network structures, the network device may include a centralized unit (CU) node and a distributed unit (DU) node, and the centralized unit and the distributed unit may also be geographically separated. In addition, a network element device in a network in the present disclosure includes, but is not limited to, a location management function (LMF).

As shown in FIG. 1, a communication system generally includes terminal devices (UEs as shown in the figure). In the present disclosure, the positioning of one of the terminal devices (also called the target UE) will be described as an example, and the proximal UE refers to a terminal device that can communicate with the target UE through a proximity discovery process.

In existing positioning technologies, a target UE may send a location request based on the UE itself or a third-party application (application function/location services client, AF/LCS client) to cause a network side to perform positioning processing based on the location request.

The positioning by way of the target UE itself sending the location request is called MO-LR (Mobile Originated-Location Request). The positioning by way of the AF/LCS client sending the location request is called MT-LR (Mobile Terminated-Location Request).

Figure 2:
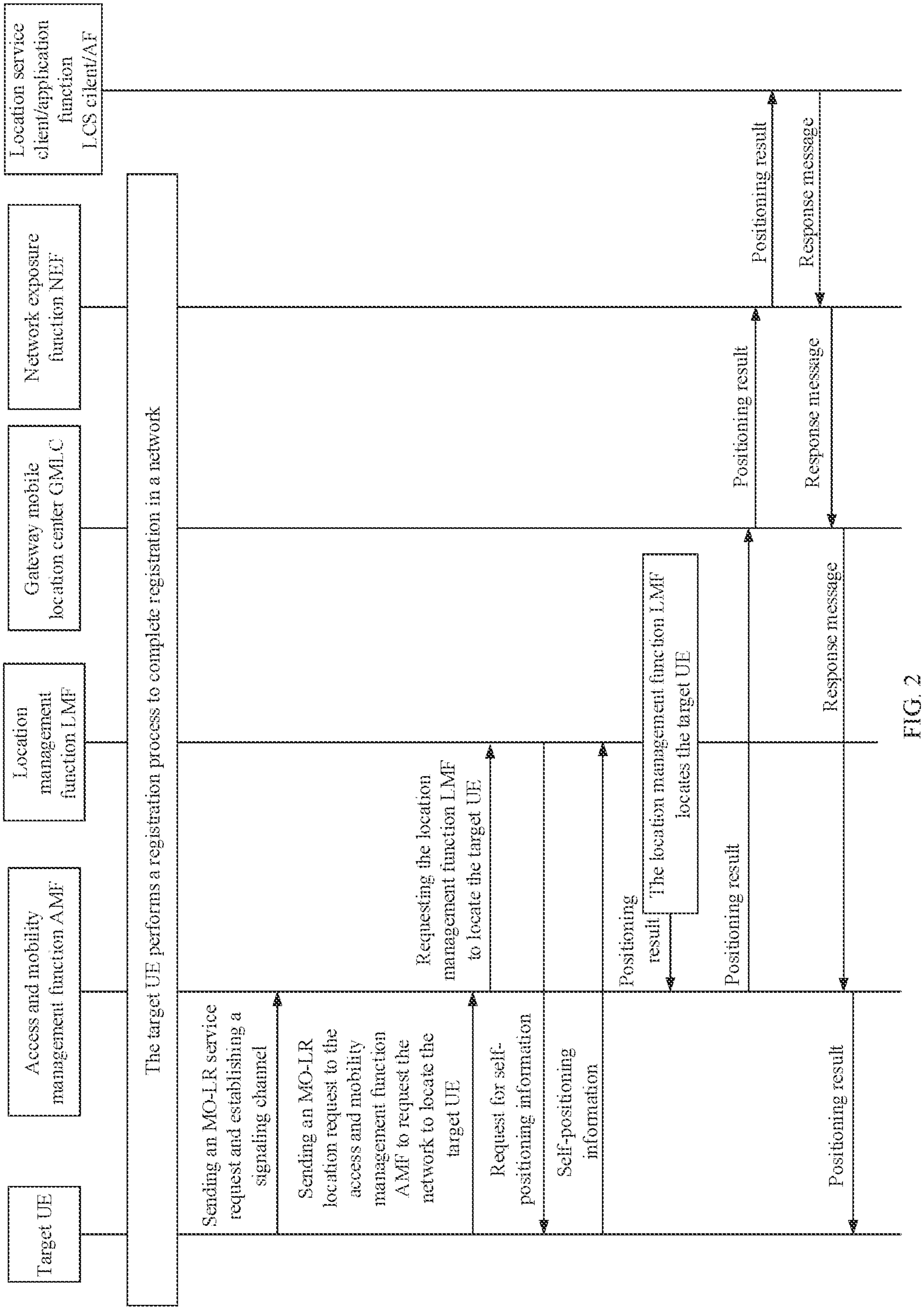
FIG. 2 is a schematic flowchart of an MO-LR-based positioning method.

FIG. 2 is a schematic flowchart of an MO-LR-based positioning method. As shown in FIG. 2, the MO-LR-based positioning method includes the following steps.

Step 201: a target UE performs a registration process to complete registration in a network.

Step 202: the target UE sends an MO-LR service request and establishes a signaling channel with an access and mobility management function AMF.

Step 203: the target UE sends an MO-LR location request to the access and mobility management function AMF to request a network to locate the target UE.

Step 204: the access and mobility management function AMF selects a matching location management function LMF and requests the location management function LMF to locate the target UE.

Step 205: the location management function LMF locates the target UE and returns a positioning result to the access and mobility management function AMF.

Step 206: the access and mobility management function AMF sends the positioning result to a gateway mobile location center GMLC.

Step 207: the gateway mobile location center GMLC sends the positioning result directly to a location service client LCS client or to an application function AF through a network exposure function NEF.

Step 208: the location service client LCS client returns response information directly to the gateway mobile location center GMLC, or the application function AF returns the response information to the gateway mobile location center GMLC through the network exposure function NEF, and the response information is returned to the access and mobility management function AMF through the gateway mobile location center GMLC and further returned to the target UE.

In step 205, in a process of locating the target UE by the location management function LMF, the location management function LMF sends a request for self-positioning information to the target UE, and the target UE returns the self-positioning information to the location management function LMF after receiving the request. The location management function LMF performs positioning processing on the target UE based on the self-positioning information to obtain the positioning result of the target UE.

Figure 3:
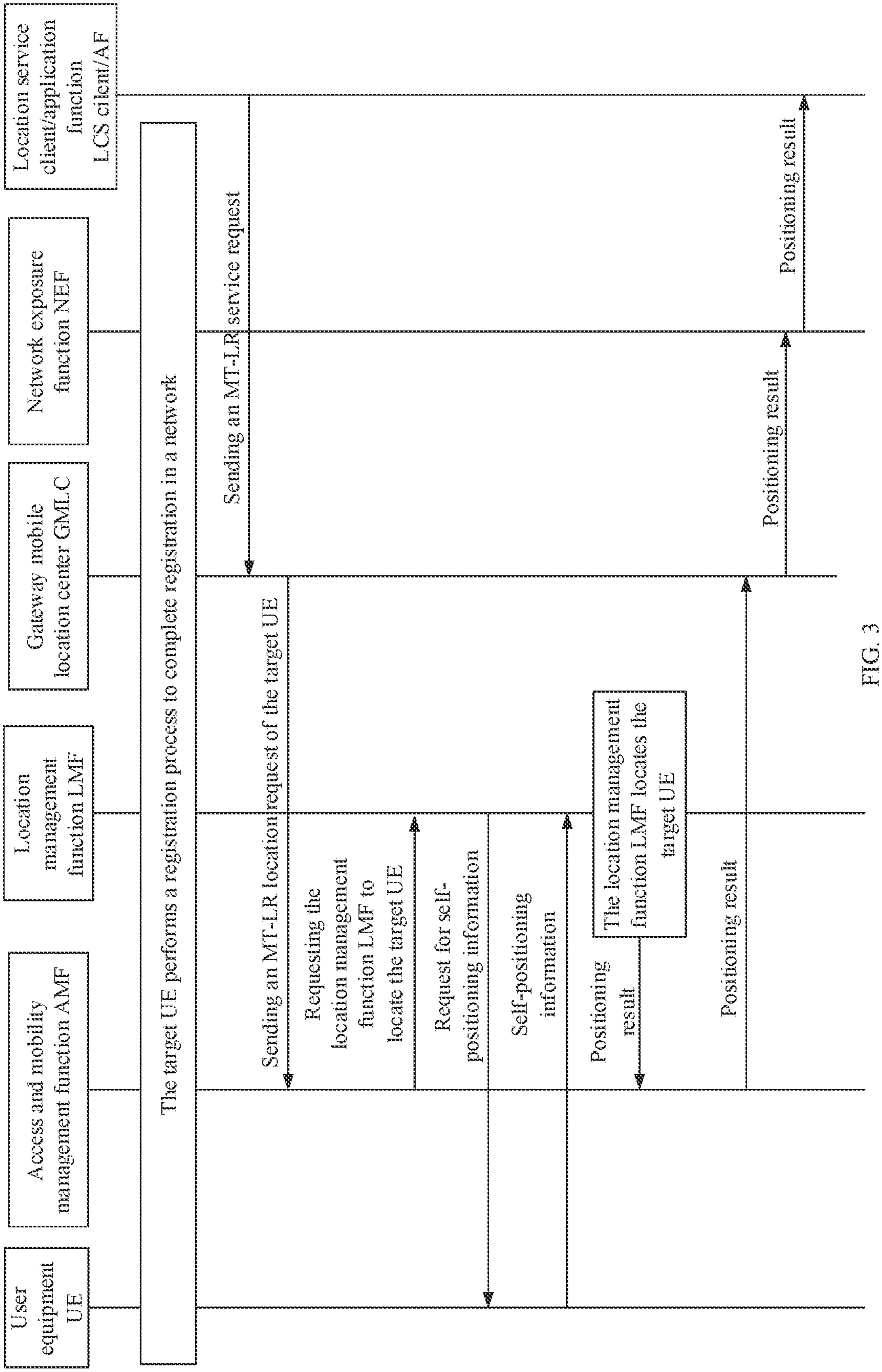
FIG. 3 is a schematic flowchart of an MT-LR-based positioning method.

FIG. 3 is a schematic flowchart of an MT-LR-based positioning method. As shown in FIG. 3, the MT-LR-based positioning method includes the following steps.

Step 301: a target UE performs a registration process to complete registration in a network.

Step 302: a location service client/application function LCS client/AF initiates an MT-LR service request and sends the MT-LR service request to a gateway mobile location center GMLC to request a network to locate the target UE.

Step 303: the GMLC sends a location request of the target UE to an access and mobility management function AMF.

Step 304: the access and mobility management function AMF selects a matching location management function LMF and requests the location management function LMF to locate the target UE.

Step 305: the location management function LMF locates the target UE, and returns a positioning result to the access and mobility management function AMF.

Step 306: the access and mobility management function AMF sends the positioning result to the gateway mobile location center GMLC.

Step 307: the gateway mobile location center GMLC sends the positioning result directly to the location service client LCS client or to the application function AF through the network exposure function NEF.

In step 305, in a process of locating the target UE by the location management function LMF, the location management function LMF sends a request for self-positioning information to the target UE, and the target UE returns the self-positioning information to the location management function LMF after receiving the request. The location management function LMF performs positioning processing on the target UE based on the self-positioning information to obtain the positioning result of the target UE.

Regardless of the positioning by way of MO-LR or MT-LR, the location management function LMF on a network side performs positioning processing on the target UE based on the self-positioning information of the target UE.

However, the positioning processing of the target UE by the network side depends on positioning capabilities of network devices around the target UE. Once the positioning capabilities of the network devices around the target UE are insufficient, such as in a case of poor signal strength/poor signal quality of the target UE, and/or, in a case that the number of network devices around the target UE is small, the accuracy of the self-positioning information returned by the target UE to the location management function LMF is greatly reduced, which greatly affects the accuracy of the positioning result obtained by the location management function LMF locating the target UE.

Based on such problems, the present disclosure considers that proximity based services ProSe (Proximity based Services) can be used to improve the positioning capability of the target UE. That is, assisted positioning information of the target UE is obtained by using a proximal UE to perform assisted positioning measurement on the target UE. The network side performs positioning processing according to obtained self-positioning information of the target UE combined with the assisted positioning information of the target UE to obtain the positioning result of the target UE.

In one embodiment, in ProSe, Layer 2/Layer 3 communication may be performed between UEs through a PC5 interface, and Layer 2/Layer 3 communication may be performed between a UE and a network through a Uu interface. Based on this, when the positioning capability of the target UE is poor, ProSe technology can be used to determine the proximal UE of the target UE as a relay UE, and relay communication through the relay UE (proximal UE) can be used to improve the positioning capability of the target UE.

In other words, by combining the location service technology and ProSe technology, the proximal UE is configured to perform assisted positioning of the target UE and the assisted positioning information is sent to the network, and the network side can better locate the target UE in combination with the assisted positioning information, and obtain a more accurate positioning result.

Embodiments of the present disclosure are described below in detail with reference to the drawings and in conjunction with the steps provided above.

Figure 4:
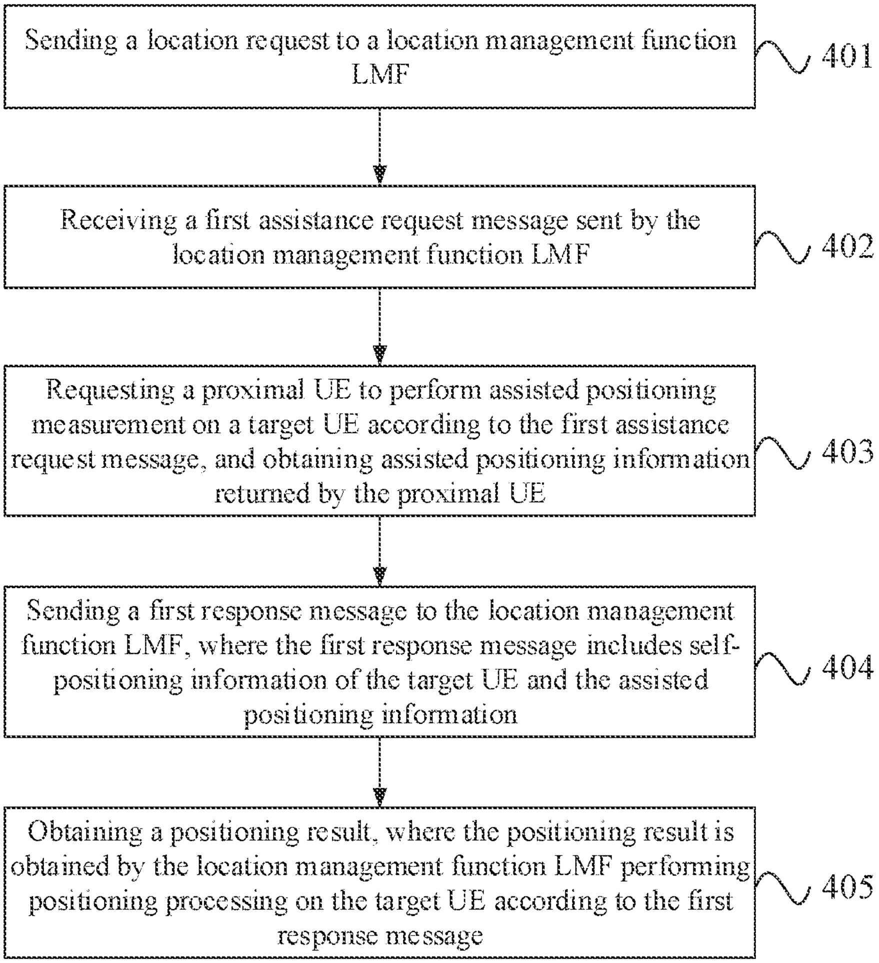
FIG. 4 is a schematic flowchart of a positioning method provided by the present disclosure.

FIG. 4 is a schematic flowchart of a positioning method provided by the present disclosure. Combining the structure and functional steps of the terminal device shown in FIG. 1, as shown in FIG. 4, an executive entity of the present embodiment is the terminal device in the structure shown in FIG. 1, and the method provided by the present embodiment is applied to the target UE.

With reference to FIG. 4, the positioning method provided by the present embodiment at least includes the following steps.

Step 401: sending a location request to a location management function LMF.

Step 402: receiving a first assistance request message sent by the location management function LMF.

Step 403: requesting a proximal UE to perform assisted positioning measurement on the target UE according to the first assistance request message, and obtaining assisted positioning information returned by the proximal UE.

Step 404: sending a first response message to the location management function LMF, where the first response message includes self-positioning information of the target UE and the assisted positioning information.

Step 405: obtaining a positioning result, where the positioning result is obtained by the location management function LMF performing positioning processing on the target UE according to the first response message.

It should be clear that one embodiment of the present disclosure is an improvement on the MO-LR-based positioning method.

In step 401 of the present disclosure, the target UE generates the location request based on usage requirements of user, and sends the location request to the location management function LMF through an access and mobility management function AMF on a network side, and the location management function LMF triggers the positioning of the target UE according to the location request based on the positioning method provided by the present disclosure.

In the positioning method provided by one embodiment of the present disclosure, different from the prior art, the target UE supports an assisted positioning function. As described in step 402, after sending the location request, the target UE receives the first assistance request message sent by the location management function LMF on the network side. The first assistance request message is sent by the location management function LMF in a case of determining to trigger an assisted positioning process, and for a determination mode for the location management function LMF to determine to trigger the assisted positioning process for the target UE, reference can be made to related description in some embodiments, which is not repeated in other embodiments.

In step 403, after receiving the first assistance request message, the target UE sends a request for assisted positioning measurement to the proximal UE of the target UE, to request the proximal UE to perform assisted positioning measurement on the target UE and obtain the assisted positioning information returned by the proximal UE.

The assisted positioning information includes: location information of the proximal UE and/or relative location information of the proximal UE and the target UE.

For example, the location information of the proximal UE includes: an absolute location of the proximal UE, and/or, a relative location of the proximal UE. The location information of the proximal UE may be, but not limited to, for example, latitude and longitude, the relative location of the proximal UE, and a distance of the proximal UE relative to a fixed coordinate.

Further, in order to improve the location accuracy, the assisted positioning information further includes the relative location information of the proximal UE and the target UE. For example, the relative location information of the proximal UE and the target UE includes information such as distance, direction, azimuth, RTT (Round Trip Time), signal strength change, etc.

In addition, still further, the assisted positioning information further includes a future trajectory of the proximal UE, a speed of the proximal UE, and so on.

The above-mentioned proximal UE refers to a UE which is determined by the target UE through a proximity discovery process and which also supports a proximity assisted positioning function. In one embodiment, the proximity discovery process is a real-time communication process based on the aforementioned ProSe technology, which includes, but is not limited to, establishing a communication channel through negotiation or broadcasting to realize service interaction and information interaction between UEs.

In one embodiment, the proximity discovery process may be a periodically triggered process, that is, the target UE may repeatedly execute the proximity discovery process according to a predetermined period to determine the proximal UE in an environment where the target UE is currently located. For each proximity discovery process, the target UE may first discover its surrounding UEs and perform communication. Subsequently, the target UE determines whether its surrounding UEs support proximity assisted positioning. Where the target UE determines whether the surrounding UEs support the proximity assisted positioning function by determining whether signaling or broadcast information sent by surrounding UEs carries a parameter of "Supporting Proximity Assisted Positioning".

That is, when the target UE finds that the signaling or broadcast information sent by a surrounding UE carries the parameter of "Supporting Proximity Assisted Positioning", the target UE determines that the surrounding UE supports the proximity assisted positioning function, and at this time, the surrounding UE may be used as the proximal UE of the target UE. On the contrary, when the target UE finds that the signaling or broadcast information sent by a surrounding UE does not carry the parameter of "Supporting Proximity Assisted Positioning", the target UE determines that the surrounding UE does not support the proximity assisted positioning function, and at this time, the surrounding UE cannot be used as the proximal UE of the target UE.

In step 404, the target UE sends the first response message to the location management function LMF after obtaining the assisted positioning information, where the first response message includes the self-positioning information of the target UE and the assisted positioning information.

The self-positioning information of the target UE refers to information obtained by the target UE performing positioning measurement of its own location. For example, the self-positioning information of the target UE includes: an absolute location of the target UE and/or, a relative location of the target UE. The self-positioning information of the target UE may be, for example, latitude and longitude, the relative location of the target UE, and a distance of the target UE relative to a fixed coordinate. In addition, the self-positioning information may also carry information including a network environment of a network where the target UE is currently located, such as signal quality; signal strength, the number of surrounding base stations, and so on. It should be clear that the specific acquisition approach of the self-positioning information is similar to the prior art, and the acquisition approach and specific composition are not limited in the present disclosure.

After obtaining the self-positioning information, the target UE may package the self-positioning information and the obtained assisted positioning information to obtain the first response message, and send the first response message to the location management function LMF.

In step 405, the target UE obtains the positioning result from the location management function LMF, where the positioning result is obtained by the location management function LMF performing positioning processing on the target UE according to the first response message. The specific implementation process of LMF determining the positioning result according to the self-positioning information of the target UE and the assisted positioning information is similar to the implementation process of assisted positioning by the base station, and will not be described in detail in the present disclosure.

So far, the target UE obtains the positioning result, and compared with the prior art, the location accuracy of the positioning result is obviously improved.

On the basis of the above implementations, the proximal UE may change due to the change of the location or the network environment of the target UE, and the assisted positioning information sent by the target UE to the location management function LMF may not meet an assisted positioning condition. At this time, the target UE will receive a retransmission message sent by the location management function LMF, and re-execute a proximity discovery process according to the retransmission message, to send new assisted positioning information returned by a new proximal UE to the location management function LMF.

That is, the target UE receives the retransmission message sent by the location management function LMF, where the retransmission message is sent by the location management function LMF when determining that the assisted positioning information does not meet the assisted positioning condition: the target UE re-executes the proximity discovery process according to the retransmission message to determine the new proximal UE, requests the new proximal UE to perform assisted positioning measurement on the target UE, obtains new assisted positioning information returned by the new proximal UE, and sends a retransmission response message to the location management function LMF, where the retransmission response message includes the new assisted positioning information and the self-positioning information of the target UE.

For example, periodic positioning or delayed positioning of the target UE may be required in the location request, or the target UE performs the proximity discovery process too early, which may cause the following situations: the proximal UE of the target UE changes during later positioning, and the assisted positioning information returned by the target UE to the LMF may not meet previous requirements of the LMF.

For example, the LMF determines that the assisted positioning information reported by the target UE does not meet the assisted positioning condition, where the assisted positioning information not meeting the assisted positioning condition may be, for example, the number of proximal UEs is too small, or signals of proximal UEs are too poor, and then steps of obtaining and reporting the assisted positioning information are repeated.

On the basis of the above-mentioned implementations, the target UE of the present disclosure further needs to indicate to the network side that the target UE supports the proximity assisted positioning function, and the location management function LMF may perform assisted-positioning-based positioning processing based on the location request of the target UE.

The target UE may indicate to the network that the target UE has the proximity assisted positioning function in various ways.

In a first case, the target UE may indicate to the network side that the target UE supports the proximity assisted positioning function in a registration process. That is, the target UE sends registration information to the network side, where the registration information includes a first proximity assisted positioning parameter, and the first proximity assisted positioning parameter is configured to represent that the target UE supports the proximity assisted positioning function.

In one embodiment, the target UE first executes the registration process after accessing the network, and the registration process includes, but is not limited to, initial registration, mobility registration, periodic registration and emergency registration. During the registration process, the target UE writes the first proximity assisted positioning parameter into the registration information to inform a network device including the location management function LMF that the target UE supports the proximity assisted positioning function. Further, the registration information also includes an application layer identifier of the target UE, and the application layer identifier is an application layer identifier used by the UE in the proximity discovery/communication process.

In a second case, the target UE indicates to the network side that the target UE supports the proximity assisted positioning function through the location request. That is, the location request carries a second proximity assisted positioning parameter, and the second proximity assisted positioning parameter is configured to represent that the target UE supports the proximity assisted positioning function.

In one embodiment, the target UE may write a parameter "Supporting Proximity Assisted Positioning" (i.e., the second proximity assisted positioning parameter) in the location request sent by the target UE. The location management function LMF on the network side, after obtaining the location request, determines that the target UE supports the proximity assisted positioning function according to the second proximity assisted positioning parameter included therein.

In a third case, the target UE may also inform the network side that the target UE supports the proximity assisted positioning function through user subscription information.

In one embodiment, the user subscription information refers to information generated when the target UE subscribes to a network provider when the target UE accesses the network, and the user subscription information generally includes, but is not limited to, user identity information, user service requirement and so on. Generally, the user subscription information is stored in a unified data management server UDM on the network side.

In one embodiment, when the target UE accesses the network, the target UE may write the second proximity assisted positioning parameter in its corresponding context through the access and mobility management function AMF.

In another embodiment, the target UE may also write the second proximity assisted positioning parameter into the user subscription information by calling a network exposure function NEF. In one embodiment, a LCS client/AF of the target UE may also call a Nudm_ParameterProvision_Ceate/Update/Delete service of the unified data management server UDM by calling a service such as Nnef_Parameter-Provision_Ceate/Update/Delete of the network exposure function NEF, to update the user subscription information of the target UE stored in the UDM, and write the second proximity assisted positioning parameter in the user subscription information.

The location management function LMF may retrieve the user subscription information in the unified data management server UDM through the access and mobility management function AMF, and determine that the target UE has proximity assisted positioning capability by obtaining the user subscription information which carries the second proximity assisted positioning parameter.

The above-mentioned carrying relevant parameters in various information for indicating that "Target UE Supports Proximity Assisted Positioning Function" may exist simultaneously, that is, if possible, the target UE may simultaneously carry the first proximity assisted positioning parameter, the second proximity assisted positioning parameter and a third proximity assisted positioning parameter in information of different processes. For the location management function LMF, it may determine that the target UE supports the proximity assisted positioning function when any of the proximity assisted positioning parameters is obtained.

The positioning method provided by embodiments of the present disclosure realizes positioning of the user equipment by combining the proximity based services, where the target UE sends the location request to the location management function LMF, receives the first assistance request message sent by the location management function LMF, requests the proximal UE to perform assisted positioning measurement on the target UE according to the first assistance request message, obtains the assisted positioning information returned by the proximal UE, sends the first response message to the location management function LMF, where the first response message includes the self-positioning information of the target UE and the assisted positioning information, and obtains the positioning result, where the positioning result is obtained by the location management function LMF performing positioning processing on the target UE according to the first response message. Compared with the existing positioning technology based on MO-LR or MT-LR, the positioning technology provided by embodiments of the present disclosure takes the assisted positioning information into account during positioning processing, and its positioning capability is stronger and the accuracy is higher.

Figure 5:
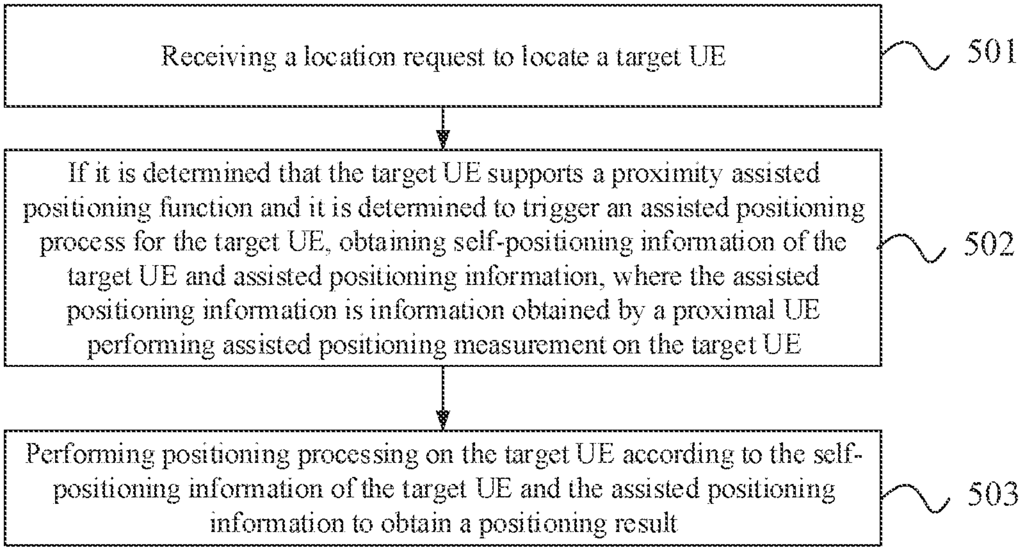
FIG. 5 is a schematic flowchart of another positioning method provided by the present disclosure.

FIG. 5 is a schematic flowchart of another positioning method provided by the present disclosure. Combining the structure and functional steps of the network device shown in FIG. 1, as shown in FIG. 5, an executive entity of the present embodiment is the network device in the structure shown in FIG. 1, and the method provided by the present embodiment is applied to a location management function LMF on a network side.

With reference to FIG. 5, the positioning method provided by the present embodiment at least includes the following steps.

Step 501: receiving a location request to locate a target UE.

Step 502: if it is determined that the target UE supports a proximity assisted positioning function and it is determined to trigger an assisted positioning process for the target UE, obtaining self-positioning information of the target UE and assisted positioning information, where the assisted positioning information is information obtained by a proximal UE performing assisted positioning measurement on the target UE.

Step 503: performing positioning processing on the target UE according to the self-positioning information of the target UE and the assisted positioning information to obtain a positioning result.

It should be clear that in the present disclosure, both the positioning for MO-LR and the positioning for MT-LR can use the positioning method provided by embodiments of the present disclosure to locate the target UE.

In the present embodiment of the present disclosure, the location management function LMF utilizes ProSe technology in a process of locating the target UE to improve the positioning capability and accuracy of the target UE.

In step 501, the location management function LMF of the network side receives the location request to locate the target UE.

In the present embodiment, the location request may be a request sent based on MO-LR, that is, the location request may be sent by the target UE through an access and mobility management function AMF. The location request may also be a request sent based on MT-LR, that is, a location service client/application function LCS client/AF sends the location request of MT-LR.

In the present embodiment, after receiving the location request, the location management function LMF determines whether the target UE supports the proximity assisted positioning function and whether to trigger the assisted positioning process.

As described in steps 502 and 503, the location management function LMF obtains the self-positioning information of the target UE and the assisted positioning information in a case of determining that the target UE supports the proximity assisted positioning function and determining to trigger the assisted positioning process for the target UE, and determines the positioning result of the target UE based on the self-positioning information of the target UE and the assisted positioning information to return to the target UE.

In some embodiments, after obtaining the assisted positioning information, the location management function LMF further determines whether the assisted positioning information meets an assisted positioning condition, to ensure that positioning processing is only executed when the assisted positioning information meets the assisted positioning condition.

For example, the assisted positioning information not meeting the assisted positioning condition may be, for example, the assisted positioning information comes from N number of proximal UEs, and N is less than a threshold, or, for example, a signal quality of the proximal UE that provides the assisted positioning information is poor, etc.

Once determining that the assisted positioning information does not meet the assisted positioning condition, the location management function LMF requests the target UE to re-execute a proximity discovery process to re-determine a proximal UE and re-obtains assisted positioning information of the target UE.

That is, if the location management function LMF determines that the assisted positioning information does not meet the assisted positioning condition, the LMF sends a retransmission message to the target UE, where the retransmission message is configured to request the target UE to re-execute the proximity discovery process.

Accordingly, after obtaining the retransmission message, as described in the previous embodiment, the target UE re-executes the proximity discovery process to determine a new proximal UE, and returns new assisted positioning information obtained by the new proximal UE performing assisted positioning measurement on the target UE to the location management function LMF through retransmission response message.

In this way, information quality of the assisted positioning information can be effectively ensured, which is conducive to further improving the accuracy of the positioning result.

Some embodiments provide two different embodiments to obtain the self-positioning information of the target UE and the assisted positioning information.

Figure 6:
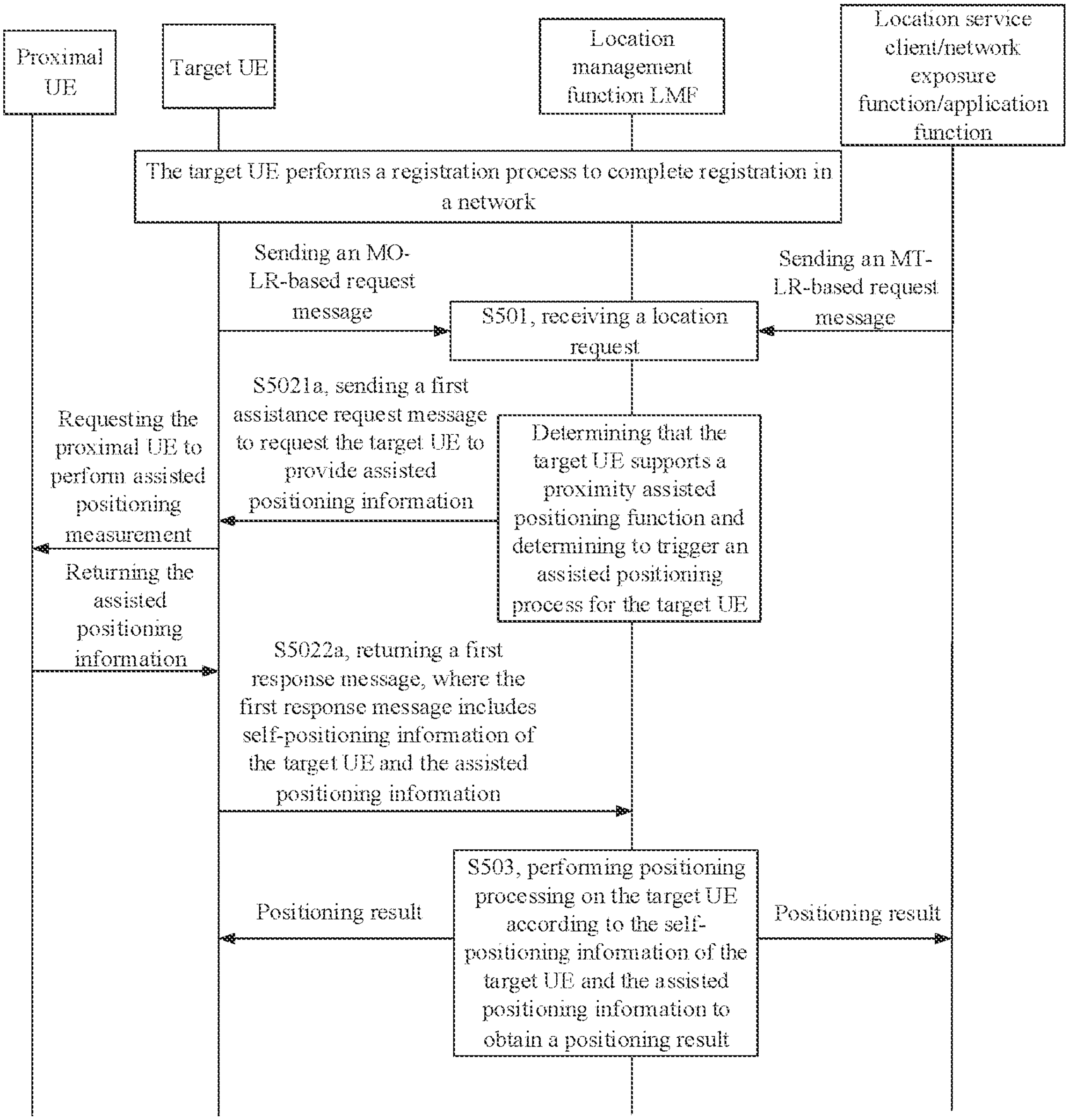
FIG. 6 is a first schematic signaling diagram of a positioning method provided by the present disclosure.

FIG. 6 is a first schematic signaling diagram of a positioning method provided by the present disclosure. Referring to FIG. 6, in a first mode, the location management function LMF may directly request the target UE to return the self-positioning information and the assisted positioning information.

S5021*a*: sending a first assistance request message to the target UE, where the first assistance request message is configured to request the target UE to report the assisted positioning information.

S5022*a*: receiving a first response message returned by the target UE, where the first response message includes the self-positioning information of the target UE and the assisted positioning information.

As described in S5021*a*-5022*a*, the location management function LMF may request the target UE to directly report the assisted positioning information through the first assistance request message. Correspondingly, after obtaining the first assistance request message, the target UE obtains the assisted positioning information through interaction with the proximal UE. At the same time, the target UE obtains the self-positioning information through self-positioning measurement. Then, the target UE simultaneously sends the two kinds of information to the location management function LMF for positioning processing.

Figure 7:
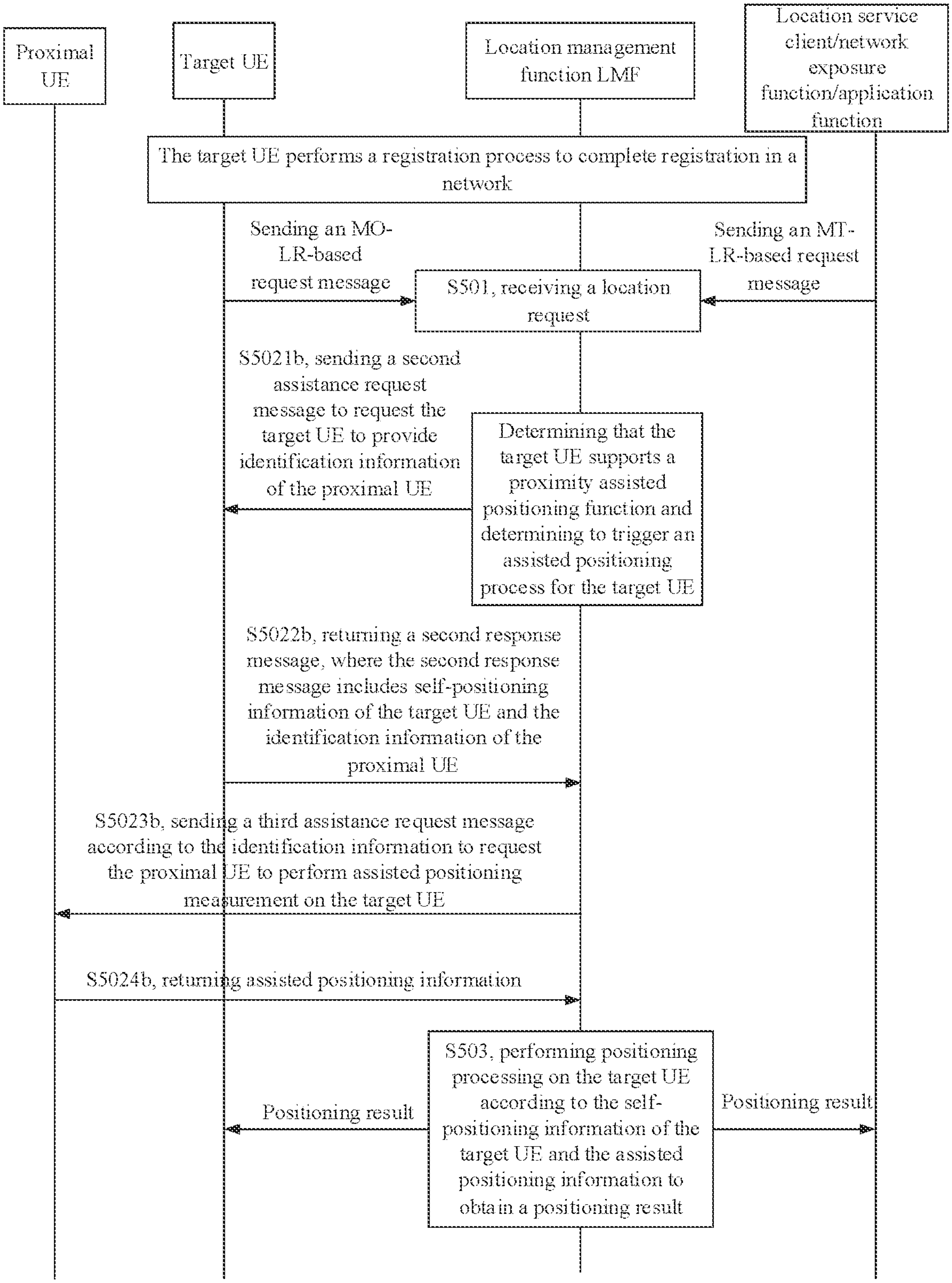
FIG. 7 is a second schematic signaling diagram of a positioning method provided by the present disclosure.

FIG. 7 is a second schematic signaling diagram of a positioning method provided by the present disclosure. Referring to FIG. 7, in a second mode, the location management function LMF may request the target UE to return UE information of the proximal UE, and request, through the UE information, the proximal UE to directly return the assisted positioning information of the target UE;

S5021*b*: sending a second assistance request message to the target UE, where the second assistance request message is configured to request the target UE to report identification information of the proximal UE.

S5022*b*: receiving a second response message returned by the target UE, where the second response message includes the self-positioning information of the target UE and the identification information of the proximal UE.

S5023*b*: sending a third assistance request message to the proximal UE according to the identification information, where the third assistance request message is configured to request the proximal UE to perform assisted positioning measurement on the target UE.

S5024*b*: receiving the assisted positioning information of the target UE returned by the proximal UE.

As described in S5021*b*-5024*b*, the location management function LMF may request, through the second assistance request message, the target UE to directly report the identification information of its current proximal UE. When obtaining the second assistance request message, on one hand, the target UE may return the identification information of the proximal UE determined by the latest execution of the proximity discovery process to the location management function LMF, and on the other hand, the target UE may synchronously return the self-positioning information obtained through self-positioning measurement to the location management function LMF. When obtaining the identification information of the proximal UE, the location management function LMF may establish communication with the proximal UE through the identification information of the proximal UE, and request the proximal UE to perform assisted positioning measurement on the target UE, to obtain the assisted positioning information of the target UE for positioning processing.

In particular, in the embodiments of the present disclosure, the way of how the location management function LMF determines that the target UE supports the proximity assisted positioning function is further provided. The location management function LMF may determine whether the target UE supports the proximity assisted positioning function by obtaining information generated by the target UE in different communication processes.

In a first case, the location management function LMF determines, according to registration information of the target UE, that the target UE supports the proximity assisted positioning function.

In one embodiment, the target UE sends the registration information to respective network devices on the network side after accessing the network. The location management function LMF may determine whether a proximity assisted positioning parameter exists in the registration information after obtaining the registration information.

The location management function LMF determines that the target UE supports the proximity assisted positioning function when determining that the proximity assisted positioning parameter exists in the registration information. Conversely, when determining that the proximity assisted positioning parameter does not exist in the registration information, the location management function LMF determines that the target UE may not support the proximity assisted positioning function.

In a second case, the location management function LMF determines, according to the location request, that the target UE supports the proximity assisted positioning function.

In one embodiment, the location management function LMF determines whether a proximity assisted positioning parameter exists in the location request after obtaining the location request.

As mentioned above, the location request may be a request sent based on MO-LR or a request sent based on MT-LR.

When the location request is based on MO-LR, the target UE writes a parameter "Supporting Proximity Assisted Positioning" in the request when sending the location request, and the access and mobility management function AMF sends the location request to the location management function LMF.

When the location request is based on MT-LR, when sending the location request, the AF/LCS Client writes a UE identifier of the target UE and a parameter "Supporting Proximity Assisted Positioning" into the request, to send the request to the location management function LMF through a gateway mobile location center GMLC and the access and mobility management function AMF in turn.

Based on this, after obtaining the location request, the location management function LMF determines whether the target UE supports the proximity assisted positioning function by determining whether the proximity assisted positioning parameter exists in the location request. That is, when the location management function LMF determines that the proximity assisted positioning parameter exists in the location request, the location management function LMF determines that the target UE supports the proximity assisted positioning function. Conversely, when the location management function LMF determines that the proximity assisted positioning parameter does not exist in the location request, the location management function LMF determines that the target UE may not support the proximity assisted positioning function.

In a third case, the location management function LMF determines, according to user subscription information of the target UE, that the target UE supports the proximity assisted positioning function.

In one embodiment, the location management function LMF, after determining that the location request is received, also reads the user subscription information of the target UE from a unified data management server UDM.

When the location management function LMF determines that a proximity assisted positioning parameter exists in the user subscription information, the location management function LMF determines that the target UE supports the proximity assisted positioning function. Conversely, when the location management function LMF determines that the proximity assisted positioning parameter does not exist in the user subscription information, the location management function LMF determines that the target UE may not support the proximity assisted positioning function.

It should be clarified that the location management function LMF can determine that the target UE supports the proximity assisted positioning function when determining in any case that the proximity assisted positioning parameter exists in information of the target UE.

On the basis of the above-mentioned embodiments, an embodiment of the present disclosure further provides a specific manner for the location management function LMF to determine to trigger the assisted positioning process of the target UE.

That is, when it is determined that a current network meet at least one condition of the following conditions, the assisted positioning process for the target UE is triggered, where the at least one condition includes: a current network environment of the target UE conforms to a network environment of assisted positioning: the location request carries location requirement information for assisted positioning processing.

In one embodiment, the current network environment of the target UE may include: the number of measurable base stations around the target UE, a signal quality of the target UE, and the like. The network side may perceive the current network environment of the target UE, and trigger the assisted positioning process for the target UE when finding that the number of measurable base stations around the target UE is small or the signal quality of the target UE is poor.

In addition, when the location request carries the location requirement information for assisted positioning processing, the assisted positioning process for the target UE may also be triggered. In one embodiment, the location requirement information refers to requirements for the target UE to trigger a location service. In some practical services, the accuracy of a positioning result of the target UE is required to be high. At this time, corresponding parameters may be written into the location requirement information described in the location request to indicate that the network side needs to perform positioning processing based on assisted positioning for the target UE.

On the basis of the above embodiments, the location management function LMF also supports positioning methods in the prior art. Generally, if the location management function LMF determines that the target UE meets the following conditions, an existing positioning method will be used to locate the target UE.

That is, if it is determined that the target UE meets one of the following conditions, the location management function LMF sends a report request of the self-positioning information to the target UE, performs positioning processing on the target UE according to the self-positioning information returned by the target UE to obtain the positioning result of the target UE, where the conditions include: the target UE does not support the proximity assisted positioning function: it is determined not to trigger the assisted positioning process for the target UE; a current network device does not support the proximity assisted positioning function.

For the determination that the target UE does not support the proximity assisted positioning function and the determination of not triggering the assisted positioning process for the target UE, reference can be made to the previous embodiments, and this will not be repeated in this implementation. As for the embodiment of determining that the current network device does not support the proximity assisted positioning function, it means that the location management function LMF itself does not support a positioning operation processing based on the assisted positioning information.

Figure 8:
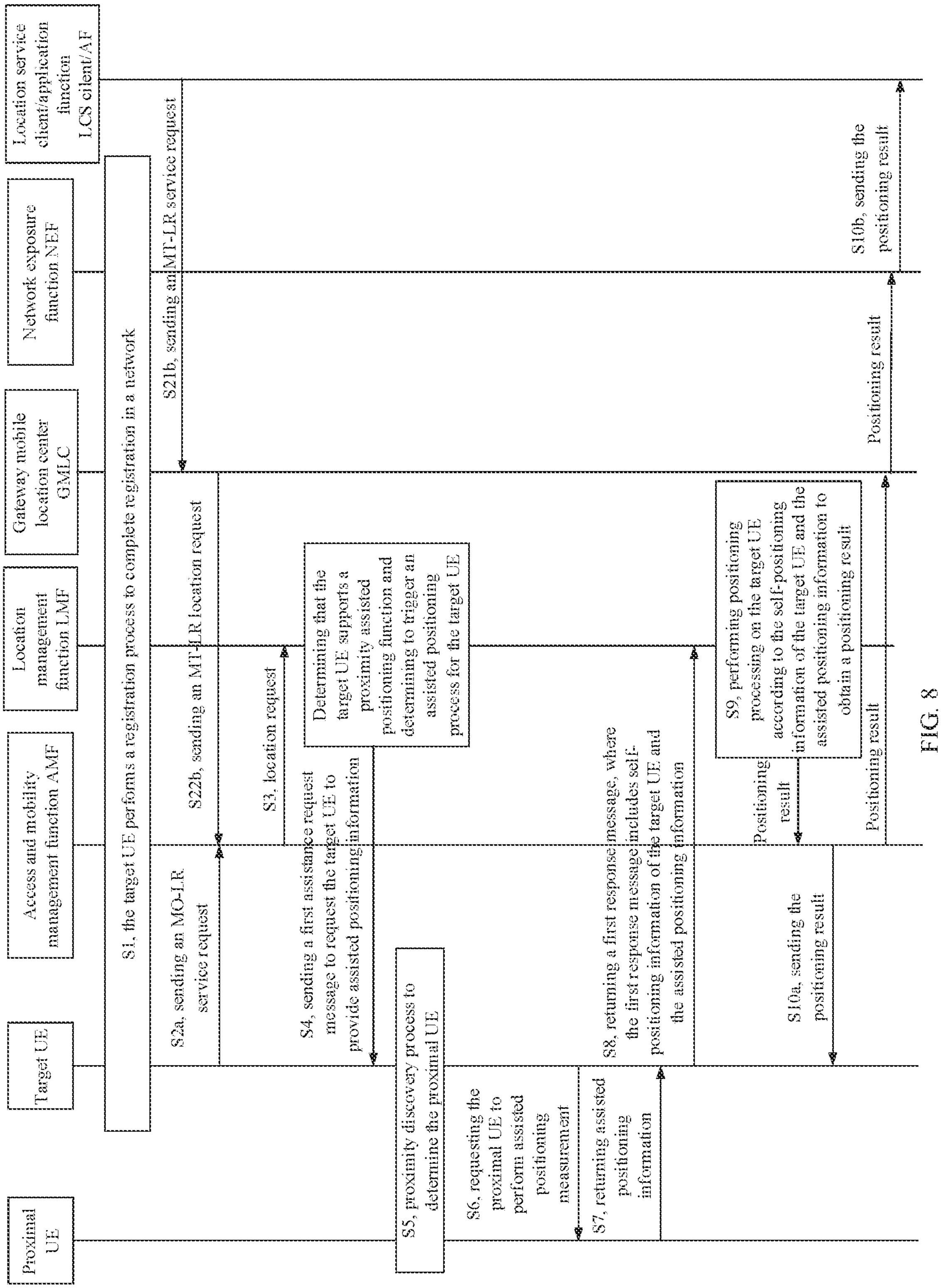
FIG. 8 is a third schematic signaling diagram of a positioning method provided by the present disclosure.

On the basis of FIG. 6, FIG. 8 is a third schematic signaling diagram of a positioning method provided by the present disclosure, and the third schematic signaling diagram is a complete signaling flow of the flow shown in FIG. 6, and the flow includes the following steps.

S1: a target UE performs a registration process to complete registration in a network: S2*a* is executed, or S21*b* is executed.

S2*a*: the target UE sends an MO-LR service request to an access and mobility management function AMF, and requests a network side to locate the target UE; S3 is executed.

S21*b*: a location service client/application function LCS client/AF sends an MT-LR service request to a gateway mobile location center GMLC to request the network side to locate the target UE.

S22*b*: the GMLC sends a location request of the target UE to the access and mobility management function AMF: S3 is executed.

S3: the access and mobility management function AMF selects a matching location management function LMF, and sends a location request to the location management function LMF to request the LMF to locate the target UE.

If it is determined that the target UE supports a proximity assisted positioning function and it is determined to trigger an assisted positioning process for the target UE, S4 is executed.

S4: the location management function LMF sends a first assistance request message to the target UE, where the first assistance request message is configured to request the target UE to report assisted positioning information.

S5: the target UE executes a proximity discovery process to determine a proximal UE. S5 may be earlier than S2*a* or S21*b*, and a triggering occasion for S5 is not limited in the present disclosure.

S6: the target UE sends a request for assisted positioning measurement to the proximal UE to request the proximal UE to perform assisted positioning measurement on the target UE.

S7: the target UE obtains the assisted positioning information returned by the proximal UE.

S8: the target UE sends a first response message to the location management function LMF, where the first response message includes self-positioning information of the target UE and the assisted positioning information.

S9: the location management function LMF performs positioning processing on the target UE according to the self-positioning information of the target UE and the assisted positioning information to obtain a positioning result, and sends the positioning result to the access and mobility management function AMF. According to requirements, S10*a* is executed, and/or, S10*b* is executed.

S10*a*: the access and mobility management function AMF returns the positioning result to the target UE.

S10*b*: the access and mobility management function AMF sends the positioning result to the location service client LCS client through the gateway mobile location center GMLC or to the application function AF through a network exposure function NEF.

The process of S4-S9 described above is different from the prior art (see FIG. 2 or FIG. 3), and the other steps are similar to the prior art. In the process, the location management function LMF may request, through the first assistance request message, the target UE to directly report the assisted positioning information. Correspondingly, after obtaining the first assistance request message, the target UE obtains the assisted positioning information through interaction with the proximal UE. At the same time, the target UE obtains the self-positioning information through self-positioning measurement. Then, the target UE simultaneously sends the two kinds of information to the location management function LMF for positioning processing.

Figure 9:
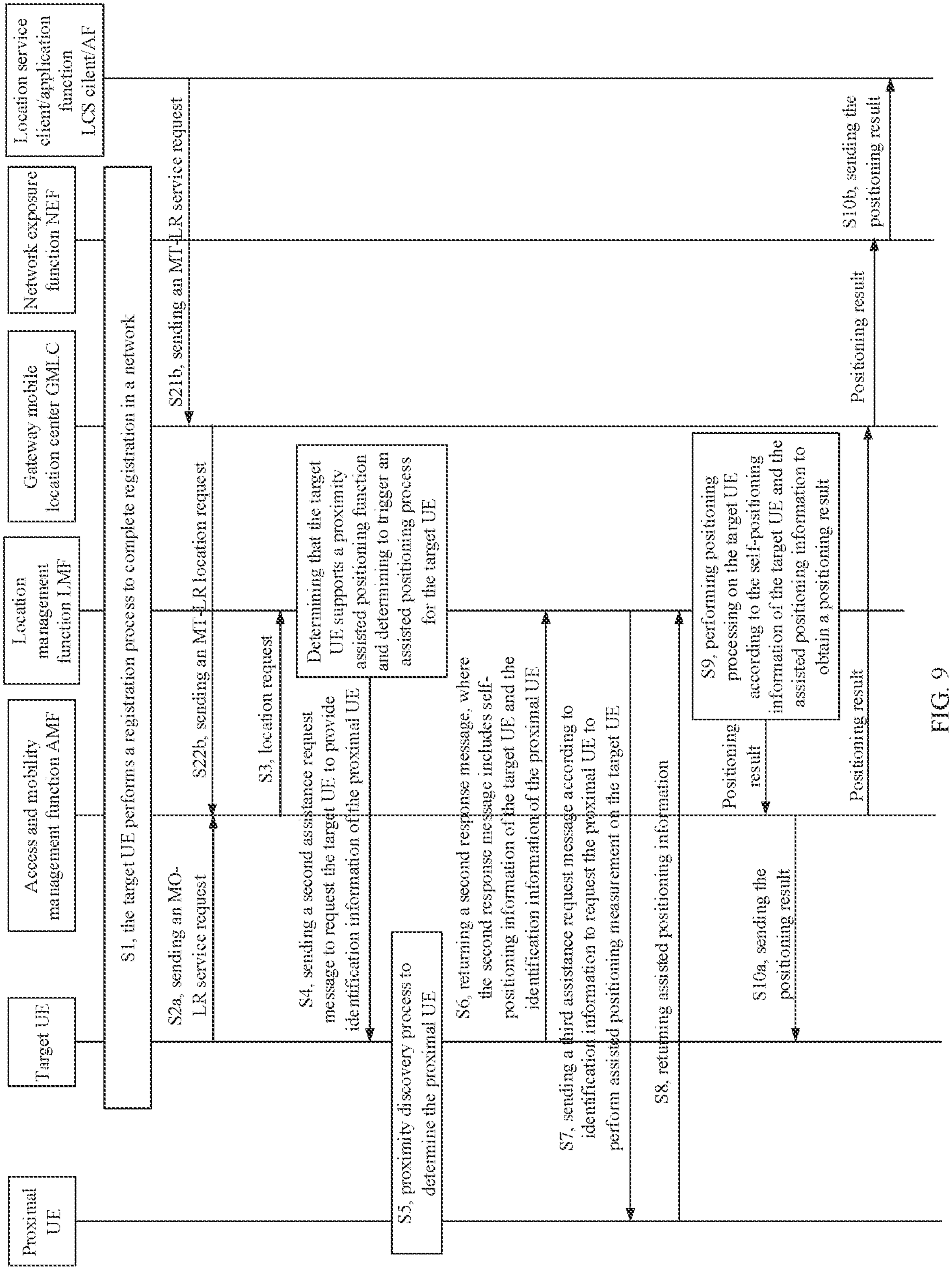
FIG. 9 is a fourth schematic signaling diagram of a positioning method provided by the present disclosure.

On the basis of FIG. 7, FIG. 9 is a fourth schematic signaling diagram of a positioning method provided by the present disclosure, and the fourth schematic signaling diagram is a complete signaling flow of the flow shown in FIG. 7, and the flow includes the following steps.

S1: a target UE performs a registration process to complete registration in a network: S2*a* is executed, or S21*b* is executed.

S2*a*: the target UE sends an MO-LR service request to an access and mobility management function AMF, and requests a network side to locate the target UE; S3 is executed.

S21*b*: a location service client/application function LCS client/AF sends an MT-LR service request to a gateway mobile location center GMLC to request the network side to locate the target UE.

S22*b*: the GMLC sends a location request of the target UE to the access and mobility management function AMF; S3 is executed.

S3: the access and mobility management function AMF selects a matching location management function LMF, and sends a location request to the location management function LMF to request the LMF to locate the target UE.

If it is determined that the target UE supports a proximity assisted positioning function and it is determined to trigger an assisted positioning process for the target UE, S4 is executed.

S4: the location management function LMF sends a second assistance request message to the target UE, where the second assistance request message is configured to request the target UE to report identification information of a proximal UE.

S5: the target UE executes a proximity discovery process to determine the proximal UE. S5 may be earlier than S2*a* or S21*b*, and a triggering occasion for S5 is not limited in the present disclosure.

S6: the target UE sends a second response message to the location management function LMF, where the second response message includes self-positioning information and the identification information of the proximal UE.

S7: the location management function LMF sends a third assistance request message to the proximal UE to request the proximal UE to perform assisted positioning measurement on the target UE.

S8: the location management function LMF obtains assisted positioning information returned by the proximal UE.

S9: the location management function LMF performs positioning processing on the target UE according to the self-positioning information of the target UE and the assisted positioning information to obtain a positioning result, and sends the positioning result to the access and mobility management function AMF. According to requirements, S10*a* is executed, and/or, S10*b* is executed.

S10*a*: the access and mobility management function AMF returns the positioning result to the target UE.

S10*b*: the access and mobility management function AMF sends the positioning result to the location service client LCS client through the gateway mobile location center GMLC or to the application function AF through a network exposure function NEF.

The process of S4-S9 described above is different from the prior art (see FIG. 2 or FIG. 3), and the other steps are similar to the prior art. The location management function LMF may request, through the second assistance request message, the target UE to directly report the identification information of its current proximal UE. When obtaining the second assistance request message, on one hand, the target UE may return the identification information of the proximal UE determined by the latest execution of the proximity discovery process to the location management function LMF, and on the other hand, the target UE may synchronously return the self-positioning information obtained through self-positioning measurement to the location management function LMF. When obtaining the identification information of the proximal UE, the location management function LMF may establish communication with the proximal UE through the identification information of the proximal UE, and request the proximal UE to perform assisted positioning measurement on the target UE, to obtain the assisted positioning information of the target UE for positioning processing.

In the solutions shown in FIG. 8 and FIG. 9, since the network combines LCS technology with ProSe, the proximal UE can assist in locating the target UE and the assisted positioning information is sent to the network side, and the network can better locate the target UE, such as achieving higher location accuracy.

The positioning method provided by the present disclosure realize positioning of the user equipment by combining the proximity based services, where the network device receives the location request for the target UE; if it is determined that the target UE supports the proximity assisted positioning function and the network device determines to trigger the assisted positioning process for the target UE, the network device obtains the self-positioning information of the target UE and the assisted positioning information, and performs positioning processing on the target UE according to the self-positioning information of the target UE and the assisted positioning information to obtain the positioning result, where the assisted positioning information is information obtained by the proximal UE performing assisted positioning measurement on the target UE. Compared with the prior art, the positioning technology provided by the present disclosure takes the assisted positioning information into account during positioning processing, and its positioning capability is stronger and the accuracy is higher.

Figure 10:
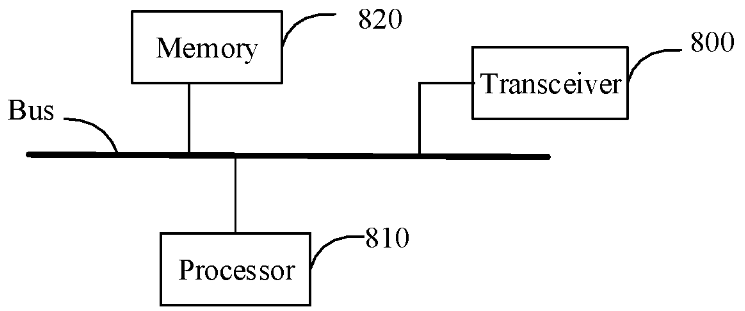
FIG. 10 is a schematic diagram of a hardware structure of a user equipment provided by the present disclosure.

FIG. 10 is a schematic diagram of a hardware structure of a user equipment provided by the present disclosure. As shown in FIG. 10, the user equipment includes a memory 820, a transceiver 800, and a processor 810;

the memory 820 is configured to store a computer program: the transceiver 800 is configured to transceive information under a control of the processor 810; the processor 810 is configured to read the computer program in the memory 820 and execute the following operations:

sending a location request to a location management function LMF:

receiving a first assistance request message sent by the location management function LMF:

requesting a proximal UE to perform assisted positioning measurement on the target UE, according to the first assistance request message, and obtaining assisted positioning information returned by the proximal UE:

sending a first response message to the location management function LMF, where the first response message includes self-positioning information of the target UE and the assisted positioning information:

obtaining a positioning result, where the positioning result is obtained by the location management function LMF performing positioning processing on the target UE according to the first response message.

In some embodiments, the assisted positioning information includes location information of the proximal UE and/or relative location information of the proximal UE and the target UE.

In some embodiments, the processor 810 is further configured to execute the following operations:

executing a proximity discovery process, and taking a UE supporting a proximity assisted positioning function discovered by the proximity discovery process as the proximal UE.

In some embodiments, the processor 810 is further configured to execute the following operations:

receiving a retransmission message sent by the location management function LMF, where the retransmission message is sent by the location management function LMF when determining that the assisted positioning information does not meet an assisted positioning condition: re-executing a proximity discovery process according to the retransmission message to determine a new proximal UE, requesting the new proximal UE to perform assisted positioning measurement on the target UE, and obtaining new assisted positioning information returned by the new proximal UE: sending a retransmission response message to the location management function LMF, where the retransmission response message includes the new assisted positioning information and the self-positioning information of the target UE.

In some embodiments, the processor 810 is further configured to execute the following operations:

sending registration information to a network side, where the registration information includes a first proximity assisted positioning parameter, and the first proximity assisted positioning parameter is configured to represent that the target UE supports a proximity assisted positioning function;

and/or, having the location request carry a second proximity assisted positioning parameter, where the second proximity assisted positioning parameter is configured to represent that the target UE supports a proximity assisted positioning function.

The user equipment provided by the present disclosure realizes the positioning of the user equipment in combination with the proximity based services. Compared with the existing positioning technology based on MO-LR or MT-LR, the positioning technology provided by the present disclosure takes the assisted positioning information into account during positioning processing, and its positioning capability is stronger and the accuracy is higher.

Figure 11:
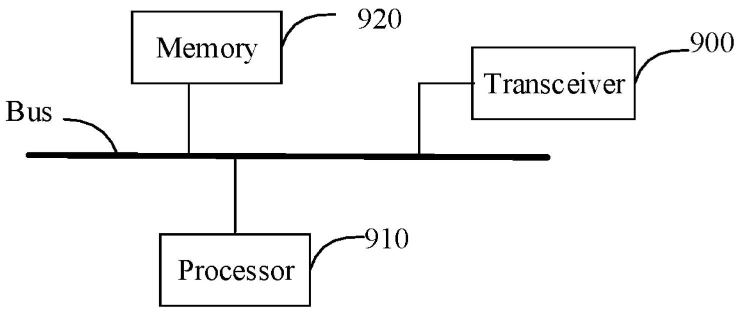
FIG. 11 is a schematic diagram of a hardware structure of a network device provided by the present disclosure.

FIG. 11 is a schematic diagram of a hardware structure of a network device provided by the present disclosure. As shown in FIG. 11, the network device includes a memory 920, a transceiver 900, and a processor 910.

the memory 920 is configured to store a computer program: the transceiver 900 is configured to transceive information under a control of the processor 910; the processor 910 is configured to read the computer program in the memory 920 and execute the following operations:

receiving a location request to locate a target UE;

if it is determined that the target UE supports a proximity assisted positioning function and it is determined to trigger an assisted positioning process for the target UE, obtaining self-positioning information of the target UE and assisted positioning information, where the assisted positioning information is information obtained by a proximal UE performing assisted positioning measurement on the target UE;

performing positioning processing on the target UE according to the self-positioning information of the target UE and the assisted positioning information to obtain a positioning result.

In some embodiments, the proximal UE refers to a UE that supports a proximity assisted positioning function determined by the target UE through a proximity discovery process.

In some embodiments, when the processor 910 executes an operation of obtaining the self-positioning information of the target UE and the assisted positioning information, the operation includes:

sending a first assistance request message to the target UE, where the first assistance request message is configured to request the target UE to report the assisted positioning information: receiving a first response message returned by the target UE, where the first response message includes the self-positioning information of the target UE and the assisted positioning information.

In some embodiments, when the processor executes an operation of obtaining the self-positioning information of the target UE and the assisted positioning information, the operation includes:

sending a second assistance request message to the target UE, where the second assistance request message is configured to request the target UE to report identification information of the proximal UE: receiving a second response message returned by the target UE, where the second response message includes the self-positioning information of the target UE and the identification information of the proximal UE.

In some embodiments, the processor 910 is further configured to execute the following operations:

sending a third assistance request message to the proximal UE according to the identification information, where the third assistance request message is configured to request the proximal UE to perform assisted positioning measurement on the target UE; receiving the assisted positioning information of the target UE returned by the proximal UE.

In some embodiments, when the processor 910 executes an operation of performing the positioning processing on the target UE according to the self-positioning information of the target UE and the assisted positioning information, the operation includes:

if the assisted positioning information does not meet an assisted positioning condition, sending a retransmission message to the target UE, where the retransmission message is configured to request the target UE to re-execute a proximity discovery process.

In some embodiments, when the processor 910 executes an operation of determining that the target UE supports the proximity assisted positioning function, the operation includes:

determining that the target UE supports the proximity assisted positioning function, according to registration information of the target UE; and/or, determining that the target UE supports the proximity assisted positioning function, according to user subscription information of the target UE; and/or, determining that the target UE supports the proximity assisted positioning function, according to the location request.

In some embodiments, when the processor 910 executes an operation of determining to trigger the assisted positioning process for the target UE, the operation includes:

if it is determined that a current network meet at least one condition of following conditions, triggering the assisted positioning process for the target UE; where the at least one condition includes:

a current network environment of the target UE conforms to a network environment of assisted positioning:

the location request carries location requirement information for assisted positioning processing.

The network device provided by the present disclosure realizes positioning of the user equipment in combination with the proximity based services. Compared with the existing positioning technology based on MO-LR or MT-LR, since the assisted positioning information is combined during positioning processing, the positioning capability is stronger and the accuracy is higher.

Figure 12:
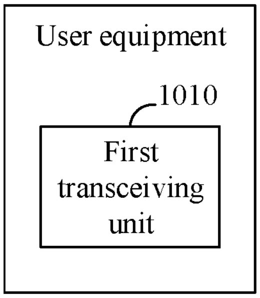
FIG. 12 is a schematic structural diagram of a user equipment provided by the present disclosure.

FIG. 12 is a schematic structural diagram of a user equipment provided by the present disclosure. As shown in FIG. 12, the user equipment includes:

a first transceiving unit 1010, configured to: send a location request to a location management function LMF: receive a first assistance request message sent by the location management function LMF: request a proximal UE to perform assisted positioning measurement on the target UE, according to the first assistance request message, and obtain assisted positioning information returned by the proximal UE: send a first response message to the location management function LMF, where the first response message includes self-positioning information of the target UE and the assisted positioning information: obtain a positioning result, where the positioning result is obtained by the location management function LMF performing positioning processing on the target UE according to the first response message.

In some embodiments, the assisted positioning information includes: location information of the proximal UE and/or relative location information of the proximal UE and the target UE.

In some embodiments, the user equipment further includes a communication unit:

the communication unit is configured to execute a proximity discovery process, and take a UE supporting a proximity assisted positioning function discovered by the proximity discovery process as the proximal UE.

In some embodiments, the first transceiving unit 1010 is further configured to receive a retransmission message sent by the location management function LMF, where the retransmission message is sent by the location management function LMF when determining that the assisted positioning information does not meet an assisted positioning condition:

the communication unit is further configured to re-execute a proximity discovery process according to the retransmission message to determine a new proximal UE, request the new proximal UE to perform assisted positioning measurement on the target UE, and obtain new assisted positioning information returned by the new proximal UE:

the first transceiving unit 1010 is further configured to send a retransmission response message to the location management function LMF, where the retransmission response message includes the new assisted positioning information and the self-positioning information of the target UE.

In some embodiments, the user equipment further includes a registration unit:

the registration unit is configured to send registration information to a network side, where the registration information includes a first proximity assisted positioning parameter, and the first proximity assisted positioning parameter is configured to represent that the target UE supports a proximity assisted positioning function.

In some embodiments, the location request carries a second proximity assisted positioning parameter, and the second proximity assisted positioning parameter is configured to represent that the target UE supports a proximity assisted positioning function.

The user equipment provided by the present disclosure realizes the positioning of the user equipment in combination with the proximity based services. Compared with the existing positioning technology based on MO-LR or MT-LR, the positioning technology provided by the present disclosure takes the assisted positioning information into account during positioning processing, and its positioning capability is stronger and the accuracy is higher.

Figure 13:
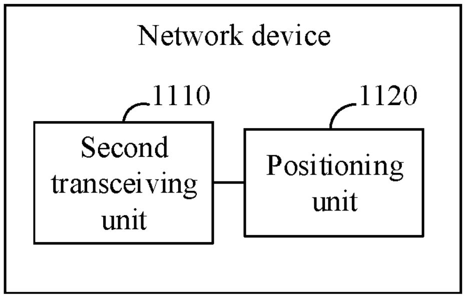
FIG. 13 is a schematic structural diagram of a network device provided by the present disclosure.

FIG. 13 is a schematic structural diagram of a network device provided by the present disclosure. As shown in FIG. 13, the network device includes:

a second transceiving unit 1110, configured to receive a location request to locate a target UE;

a positioning unit 1120, configured to: obtain self-positioning information of the target UE and assisted positioning information in a case of determining that the target UE supports a proximity assisted positioning function and determining to trigger an assisted positioning process for the target UE, where the assisted positioning information is information obtained by a proximal UE performing assisted positioning measurement on the target UE; perform positioning processing on the target UE according to the self-positioning information of the target UE and the assisted positioning information to obtain a positioning result;

the second transceiving unit 1110 is further configured to return the positioning result to the target UE.

In some embodiments, the second transceiving unit 1110 is further configured to: send a first assistance request message to the target UE, where the first assistance request message is configured to request the target UE to report the assisted positioning information; receive a first response message returned by the target UE, where the first response message includes the self-positioning information of the target UE and the assisted positioning information.

In some embodiments, the second transceiving unit 1110 is further configured to: send a second assistance request message to the target UE, where the second assistance request message is configured to request the target UE to report identification information of the proximal UE; receive a second response message returned by the target UE, where the second response message includes the self-positioning information of the target UE and the identification information of the proximal UE.

In some embodiments, the second transceiving unit 1110 is further configured to: send a third assistance request message to the proximal UE according to the identification information, where the third assistance request message is configured to request the proximal UE to perform assisted positioning measurement on the target UE;

receive the assisted positioning information of the target UE returned by the proximal UE.

In some embodiments, the positioning unit 1120 is configured to control the second transceiving unit 1110 to, if the assisted positioning information does not meet an assisted positioning condition, send a retransmission message to the target UE, where the retransmission message is configured to request the target UE to re-execute a proximity discovery process.

In some embodiments, the positioning unit 1120 is configured to determine, according to registration information of the target UE, that the target UE supports the proximity assisted positioning function.

In some embodiments, the positioning unit 1120 is configured to determine, according to user subscription information of the target UE, that the target UE supports the proximity assisted positioning function.

In some embodiments, the positioning unit 1120 is configured to determine, according to the location request, that the target UE supports the proximity assisted positioning function.

In some embodiments, the positioning unit 1120 is configured to, if it is determined that a current network meet at least one condition of following conditions, trigger the assisted positioning process for the target UE;

where the at least one condition includes: a current network environment of the target UE conforms to a network environment of assisted positioning: the location request carries location requirement information for assisted positioning processing.

In some embodiments, the positioning unit 1120 is further configured to: if it is determined that the target UE meets one of following conditions, send a report request of the self-positioning information to the target UE; perform the positioning processing on the target UE according to the self-positioning information returned by the target UE to obtain the positioning result of the target UE; where the conditions include: the target UE does not support the proximity assisted positioning function: it is determined not to trigger the assisted positioning process for the target UE; a current network device does not support the proximity assisted positioning function.

Compared with the existing positioning technology based on MO-LR or MT-LR, the positioning technology provided by the present disclosure takes the assisted positioning information into account during positioning processing, and its positioning capability is stronger and the accuracy is higher.

The present disclosure further provides a computer-readable storage medium, where the computer-readable storage medium stores a computer program, and the computer program is configured to cause a processor to execute the method according to the preceding embodiments.

The computer-readable storage medium may be any available medium or data storage device that a computer can access, including but not limited to, a magnetic memory (such as a floppy disk, a hard disk, a magnetic tape, a magneto-optical disk (MO), etc.), an optical memory (such as a compact disc (CD), a digital videodisk (DVD), a blu-ray disc (BD), a high-definition versatile disc (HVD), etc.), and a semiconductor memory (such as a read-only memory (ROM), an erasable programmable read-only memory (EPROM), an electrically erasable programmable read-only memory (EEPROM), a non-volatile memory (NAND FLASH), a solid state disk (SSD)), etc.

The present disclosure further provides a computer program product, including a computer program, where when the computer program is executed by a processor, the method according to the preceding embodiments.

The embodiments of the present disclosure can be provided as methods, systems or computer program products. Therefore, the present disclosure may take forms of entire-hardware embodiments, entire-software embodiments, or embodiments combining software and hardware aspects. Furthermore, the present disclosure may take a form of a computer program product implemented on one or more computer-usable storage media (including but not limited to a disk storage, an optical storage, etc.) in which computer-usable program codes are included.

The present disclosure is described with reference to flowcharts and/or block diagrams of methods, devices (systems) and computer program products according to the embodiments of the present disclosure. It should be understood that each flow and/or block in the flowcharts and/or block diagrams, and a combination of flows and/or blocks in the flowcharts and/or block diagrams may be implemented by computer-executable instructions. These computer-executable instructions may be provided to a processor of a general-purpose computer, a special-purpose computer, an embedded processor or other programmable data processing devices to produce a machine, and an apparatus for implementing functions specified in one or more flows of the flowcharts and/or one or more blocks of the block diagrams is produced by instructions executed by the processor of the computer or other programmable data processing devices.

These processor-executable instructions may also be stored in a computer-readable memory that can guide a computer or other programmable data processing devices to work in a specific way, and the instructions stored in the processor-readable memory produce a manufactured product including an instruction apparatus, and the instruction apparatus implements functions specified in one or more flows of the flowcharts and/or one or more blocks of the block diagrams.

These processor-executable instructions may also be loaded on a computer or other programmable data processing devices, and a series of operation steps are executed on the computer or other programmable devices to produce computer-implemented processing, and the instructions executed on the computer or other programmable devices provide steps for implementing functions specified in one or more flows of the flowcharts and/or one or more blocks of the block diagrams.

The invention claimed is:

1. A positioning method, wherein the positioning method is applied to a terminal device, and the method comprises:

sending a location request to a location management function (LMF);

receiving a first assistance request message sent by the location management function (LMF);

requesting a UE in proximity to perform assisted positioning measurement on a target user equipment (UE) according to the first assistance request message, and obtaining assisted positioning information returned by the UE in proximity, wherein the assisted positioning information comprises: location information of the UE in proximity and/or relative location information of the UE in proximity and the target UE, and the relative location information comprises one or more of an azimuth, a round trip time (RTT), or a signal strength change;

sending a first response message to the location management function (LMF), wherein the first response message comprises self-positioning information of the target UE and the assisted positioning information;

obtaining a positioning result, wherein the positioning result is obtained by the location management function (LMF) performing positioning processing on the target UE according to the first response message.

2. The positioning method according to claim 1, further comprising:

executing a proximity discovery process, and taking a UE supporting a proximity assisted positioning function discovered by the proximity discovery process as the UE in proximity.

3. The positioning method according to claim 1, further comprising:

receiving a retransmission message sent by the location management function (LMF), wherein the retransmission message is sent by the location management function (LMF) when determining that the assisted positioning information does not meet an assisted positioning condition;

re-executing a proximity discovery process according to the retransmission message to determine a new UE in proximity, requesting the new UE in proximity to perform assisted positioning measurement on the target UE, and obtaining new assisted positioning information returned by the new UE in proximity;

sending a retransmission response message to the location management function (LMF), wherein the retransmission response message comprises the new assisted positioning information and the self-positioning information of the target UE.

4. The positioning method according to claim 1, further comprising:

sending registration information to a network side, wherein the registration information comprises a first proximity assisted positioning parameter, and the first proximity assisted positioning parameter is configured to represent that the target UE supports a proximity assisted positioning function.

5. The positioning method according to claim 1, wherein the location request carries a second proximity assisted positioning parameter, and the second proximity assisted positioning parameter is configured to represent that the target UE supports a proximity assisted positioning function.

6. A positioning method, wherein the positioning method is applied to a network device, and the method comprises:

receiving a location request to locate a target UE;

upon determining that the target UE supports a proximity assisted positioning function and it is determined to trigger an assisted positioning process for the target UE, sending a first assistance request message to the target UE, wherein the first assistance request message is configured to request the target UE to report assisted positioning information;

receiving a first response message returned by the target UE, wherein the first response message comprises self-positioning information of the target UE and the assisted positioning information, wherein the assisted positioning information is information obtained by a UE in proximity performing assisted positioning measurement on the target UE, the assisted positioning information comprises: location information of the UE in proximity and/or relative location information of the UE in proximity and the target UE, and the relative location information comprises one or more of an azimuth, a round trip time (RTT), or a signal strength change;

performing positioning processing on the target UE according to the self-positioning information of the target UE and the assisted positioning information to obtain a positioning result.

7. The positioning method according to claim 6, wherein the method further comprises:

sending a second assistance request message to the target UE, wherein the second assistance request message is configured to request the target UE to report identification information of the UE in proximity;

receiving a second response message returned by the target UE, wherein the second response message comprises the self-positioning information of the target UE and the identification information of the UE in proximity.

8. The positioning method according to claim 7, further comprising:

sending a third assistance request message to the UE in proximity according to the identification information, wherein the third assistance request message is configured to request the UE in proximity to perform assisted positioning measurement on the target UE;

receiving the assisted positioning information of the target UE returned by the UE in proximity.

9. The positioning method according to claim 6, wherein performing the positioning processing on the target UE according to the self-positioning information of the target UE and the assisted positioning information comprises:

if the assisted positioning information does not meet an assisted positioning condition, sending a retransmission message to the target UE, wherein the retransmission message is configured to request the target UE to re-execute a proximity discovery process.

10. The positioning method according to claim 6, wherein determining that the target UE supports the proximity assisted positioning function comprises:

determining that the target UE supports the proximity assisted positioning function, according to registration information of the target UE.

11. The positioning method according to claim 6, wherein determining that the target UE supports the proximity assisted positioning function comprises:

determining that the target UE supports the proximity assisted positioning function, according to user subscription information of the target UE.

12. The positioning method according to claim 6, wherein determining that the target UE supports the proximity assisted positioning function comprises:

determining that the target UE supports the proximity assisted positioning function, according to the location request.

13. The positioning method according to claim 6, wherein determining to trigger the assisted positioning process for the target UE comprises:

upon determining that a current network meet at least one condition of following conditions, triggering the assisted positioning process for the target UE;

wherein the at least one condition comprises:

a current network environment of the target UE conforms to a network environment of assisted positioning;

the location request carries location requirement information for assisted positioning processing.

14. The positioning method according to claim 6, further comprising:

upon determining that the target UE meets one of following conditions, sending a report request of the self-positioning information to the target UE;

performing the positioning processing on the target UE according to the self-positioning information returned by the target UE to obtain the positioning result of the target UE, wherein the conditions comprise:

the target UE does not support the proximity assisted positioning function;

it is determined not to trigger the assisted positioning process for the target UE;

a current network device does not support the proximity assisted positioning function.

15. A user equipment, wherein the user equipment comprises a memory, a transceiver, and a processor;

the memory is configured to store a computer program; the transceiver is configured to transceive information under a control of the processor; the processor is configured to read the computer program in the memory and execute the following operations:

sending a location request to a location management function (LMF);

receiving a first assistance request message sent by the location management function (LMF);

requesting a UE in proximity to perform assisted positioning measurement on a target user equipment (UE) according to the first assistance request message, and obtaining assisted positioning information returned by the UE in proximity, wherein the assisted positioning information comprises: location information of the UE in proximity and/or relative location information of the UE in proximity and the target UE, and the relative location information comprises one or more of an azimuth, a round trip time (RTT), or a signal strength change;

sending a first response message to the location management function (LMF), wherein the first response message comprises self-positioning information of the target UE and the assisted positioning information;

obtaining a positioning result, wherein the positioning result is obtained by the location management function (LMF) performing positioning processing on the target UE according to the first response message.

16. A network device, wherein the network device comprises a memory, a transceiver, and a processor;

the memory is configured to store a computer program; the transceiver is configured to transceive information under a control of the processor; the processor is configured to read the computer program in the memory and execute the positioning method according to claim 6.

17. A non-transitory processor-readable storage medium, wherein the processor-readable storage medium stores a computer program, and the computer program is configured to cause a processor to execute the positioning method according to claim 1.

18. A non-transitory processor-readable storage medium, wherein the processor-readable storage medium stores a computer program, and the computer program is configured to cause a processor to execute the positioning method according to claim 6.

* * * * *